US008649938B2

(12) United States Patent
Matsumoto et al.

(10) Patent No.: US 8,649,938 B2
(45) Date of Patent: Feb. 11, 2014

(54) SYSTEM, PROGRAM PRODUCT, AND METHOD FOR DYNAMIC CONTROL OF VEHICLE

(75) Inventors: Toshiki Matsumoto, Kariya (JP); Mamoru Sawada, Yokkaichi (JP); Motoaki Kataoka, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/557,540

(22) Filed: Jul. 25, 2012

(65) Prior Publication Data
US 2013/0030648 A1    Jan. 31, 2013

(30) Foreign Application Priority Data

Jul. 27, 2011    (JP) ................................. 2011-164699

(51) Int. Cl.
G05D 29/00    (2006.01)

(52) U.S. Cl.
USPC .......................................................... 701/36

(58) Field of Classification Search
USPC .............. 701/22, 37, 36, 48, 66, 69; 180/197, 180/65.265, 65.27, 65.275, 333
See application file for complete search history.

(56) References Cited

U.S. PATENT DOCUMENTS

| | | | | |
|---|---|---|---|---|
| 6,564,140 | B2 * | 5/2003 | Ichikawa et al. | 701/91 |
| 7,561,951 | B2 * | 7/2009 | Rao et al. | 701/48 |
| 7,885,751 | B2 * | 2/2011 | Otake | 701/96 |
| 2004/0128044 | A1 * | 7/2004 | Hac | 701/48 |
| 2005/0049761 | A1 | 3/2005 | Kataoka et al. | |
| 2006/0253240 | A1 * | 11/2006 | Rao et al. | 701/48 |
| 2007/0095588 | A1 * | 5/2007 | Mattes et al. | 180/197 |
| 2008/0249690 | A1 * | 10/2008 | Matsumoto et al. | 701/48 |
| 2009/0062984 | A1 * | 3/2009 | Poilbout | 701/37 |
| 2010/0036557 | A1 * | 2/2010 | Lu | 701/29 |
| 2010/0211256 | A1 * | 8/2010 | Takenaka et al. | 701/29 |
| 2012/0029769 | A1 * | 2/2012 | Chen et al. | 701/38 |
| 2012/0296567 | A1 * | 11/2012 | Breed | 701/468 |

FOREIGN PATENT DOCUMENTS

| | | |
|---|---|---|
| JP | 02-208136 | 8/1990 |
| JP | 2004-168148 | 6/2004 |
| JP | 2007-160973 | 6/2007 |
| JP | 2010-208633 | 9/2010 |

OTHER PUBLICATIONS

Office Action issued Jun. 11, 2013 in corresponding Japanese Application No. 2011-164699 (with English translation).

* cited by examiner

*Primary Examiner* — Mary Cheung
*Assistant Examiner* — Rodney Butler
(74) *Attorney, Agent, or Firm* — Harness, Dickey & Pierce, PLC

(57) ABSTRACT

In a control system, a first estimator estimates, as a first controlled force, a force being applied to a controlled object. A second estimator estimates, as a second controlled force, a force being transferred to the controlled object. An external force estimator estimates, as an external force, a force being exerted on the vehicle as the vehicle runs. A dynamics estimator estimates, based on the first controlled force, the second controlled force, and the external force, a value of a parameter that represents the dynamics of the controlled object. A compensator compensates for at least one of the first controlled force and the second controlled force such that the value of the parameter is within a preset target range.

11 Claims, 18 Drawing Sheets

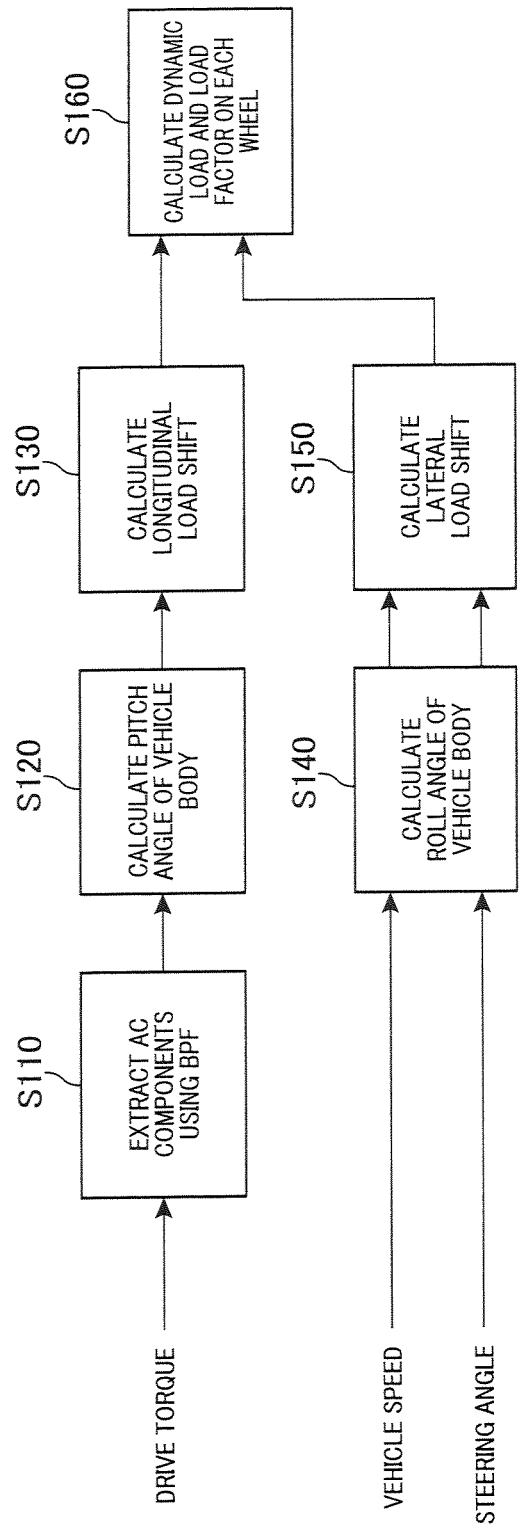

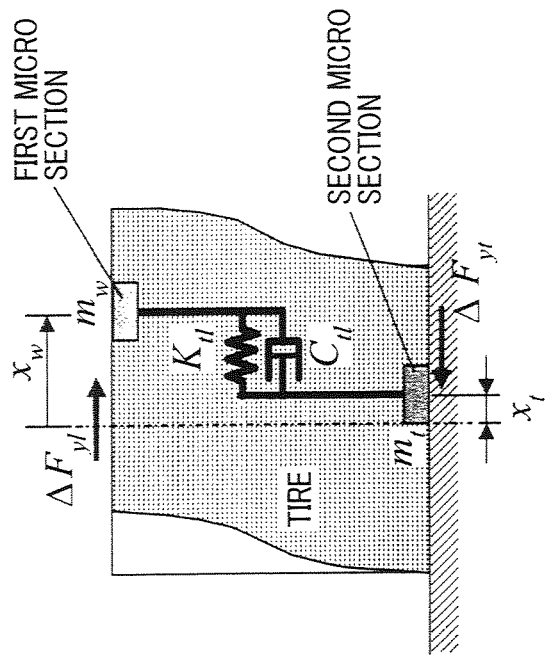
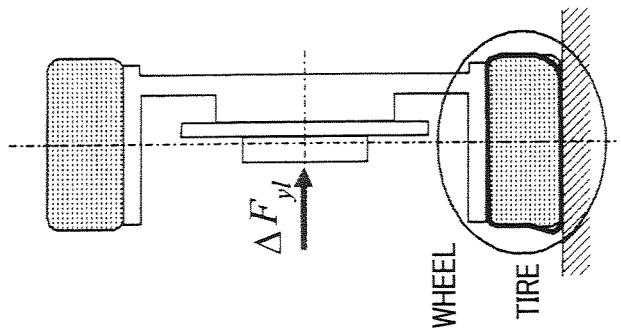

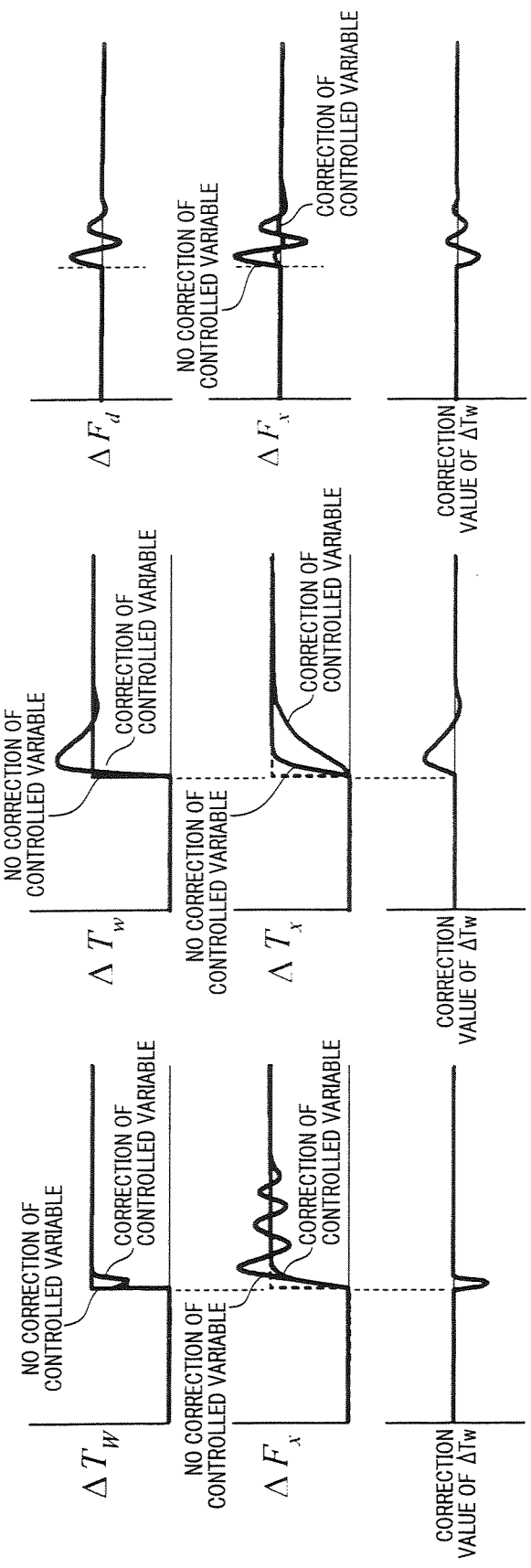

SYSTEM, PROGRAM PRODUCT, AND METHOD FOR DYNAMIC CONTROL OF VEHICLE

CROSS REFERENCE TO RELATED APPLICATIONS

This application is based and claims the benefit of priority from Japanese Patent Application 2011-164699 filed on Jul. 27, 2011, the disclosure of which is incorporated in its entirety by reference.

TECHNICAL FIELD

The present disclosure relates to systems, program products, and methods for dynamic control of vehicles.

BACKGROUND

A plurality of systems, such as an engine control system, a drivetrain system, a brake system, a steering system, suspension systems, and so on, of vehicles determines the dynamics of the vehicles. Thus, control of the plurality of systems of a motor vehicle controls the dynamics of the vehicle. One technical approach for controlling the plurality of systems of a motor vehicle is disclosed in Japanese Patent Application Publication No. H02-208136.

This technical approach uses a plurality of dynamic models of the plurality of systems of a target vehicle, and adjusts controlled variables of each of the plurality of dynamic models to improve the safety of the target vehicle.

SUMMARY

Control of a system of a target vehicle may cause an unintentional force to be exerted on other systems of the target vehicle, resulting in adverse effects on the other systems. For example, control of the drivetrain system of a target vehicle to change a driving force of the target vehicle in its longitudinal direction may cause a reaction force in a tire lateral force to be simultaneously generated. The reaction force may be transferred to a rack and pinion of the steering system via wheels, hub carriers, suspension arms, a chassis, and so on, and may cause adverse effects on dynamic characteristics of the steering system. On the other hand, control of the steering system may cause adverse effects on the dynamic characteristics of the drivetrain system.

From these viewpoints, the technical approach set forth above does not consider that control of a system of a target vehicle may cause an unintentional force to be applied to other systems. For this reason, the technical approach may not improve the safety of the target vehicle due to the magnitude of the unintentional force.

In view of the circumstances set forth above, one aspect of the present disclosure seeks to provide systems for dynamic control of a vehicle, which are designed to address at least the problem set forth above.

Specifically, an alternative aspect of the present disclosure aims to provide such systems capable of further improving the safety of a vehicle.

In addition, a further aspect of the present disclosure aims to provide program products and methods for dynamic control of a vehicle, which are capable of further improving the safety of the vehicle.

According to a first exemplary aspect of the present disclosure, there is provided a control system installed in a vehicle for controlling a controlled object and at least one part of the vehicle. Dynamics of the controlled object are subject to dynamics of the at least one part. The control system includes a first controlled-force estimator that estimates, as a first controlled force, a force being applied to the controlled object of the vehicle for controlling the controlled object. The control system includes a second controlled-force estimator that estimates, as a second controlled force, a force being transferred to the controlled object due to control of the at least one part. The control system includes an external force estimator that estimates, as an external force, a force being exerted on the vehicle as the vehicle runs. The control system includes a dynamics estimator that estimates, based on the first controlled force, the second controlled force, and the external force, a value of a parameter that represents the dynamics of the controlled object. The control system includes a compensator that compensates for at least one of the first controlled force and the second controlled force such that the value of the parameter is within a preset target range.

According to a second exemplary aspect of the present disclosure, there is provided a computer program product. The computer program product includes a non-transitory computer-readable medium, and a set of computer program instructions embedded in the computer-readable medium for controlling a controlled object and at least one part of a vehicle. Dynamics of the controlled object are subject to dynamics of the at least one part. The instructions cause a computer to: estimate, as a first controlled force, a force being applied to the controlled object of the vehicle for controlling the controlled object; estimate, as a second controlled force, a force being transferred to the controlled object due to control of the at least one part; estimate, as an external force, a force being exerted on the vehicle as the vehicle runs; estimate, based on the first controlled force, the second controlled force, and the external force, a value of a parameter that represents the dynamics of the controlled object; and compensate for at least one of the first controlled force and the second controlled force such that the value of the parameter is within a preset target range.

According to a third exemplary aspect of the present disclosure, there is provided a method of a control system installed in a vehicle for controlling a controlled object and at least one part of the vehicle. Dynamics of the controlled object are subject to dynamics of the at least one part. The method includes estimating, as a first controlled force, a force being applied to the controlled object of the vehicle for controlling the controlled object; estimating, as a second controlled force, a force being transferred to the controlled object due to control of the at least one part; estimating, as an external force, a force being exerted on the vehicle as the vehicle runs; estimating, based on the first controlled force, the second controlled force, and the external force, a value of a parameter that represents the dynamics of the controlled object; and compensating for at least one of the first controlled force and the second controlled force such that the value of the parameter is within a preset target range.

The configuration of each of the vehicle control system, the program product, and the method estimates the dynamics of the controlled object with consideration of not only the first controlled force being applied to the controlled object but also a force being exerted on another portion of the vehicle. Thus, it is possible to accurately estimate the dynamics of the controlled object.

Adjusting the at least one parameter indicative of the dynamics of the controlled object within the preset target range allows vibration of the vehicle to be reduced, and the stability of the vehicle and the responsivity of the control system to be improved.

The above and/or other features, and/or advantages of various aspects of the present disclosure will be further appreciated in view of the following description in conjunction with the accompanying drawings. Various aspects of the present disclosure can include or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of an embodiment with reference to the accompanying drawings in which:

FIG. 4 is a flowchart schematically illustrating specific steps of an operation in step S20 illustrated in FIG. 30;

FIGS. 9A and 9B schematically illustrate a lateral vibration model according to this embodiment;

FIGS. 17A to 17C schematically illustrate technical effects achieved by the vehicle control system according to this embodiment.

DETAILED DESCRIPTION OF EMBODIMENT

An embodiment of the present disclosure will be described hereinafter with reference to the accompanying drawings.

Figure 1:
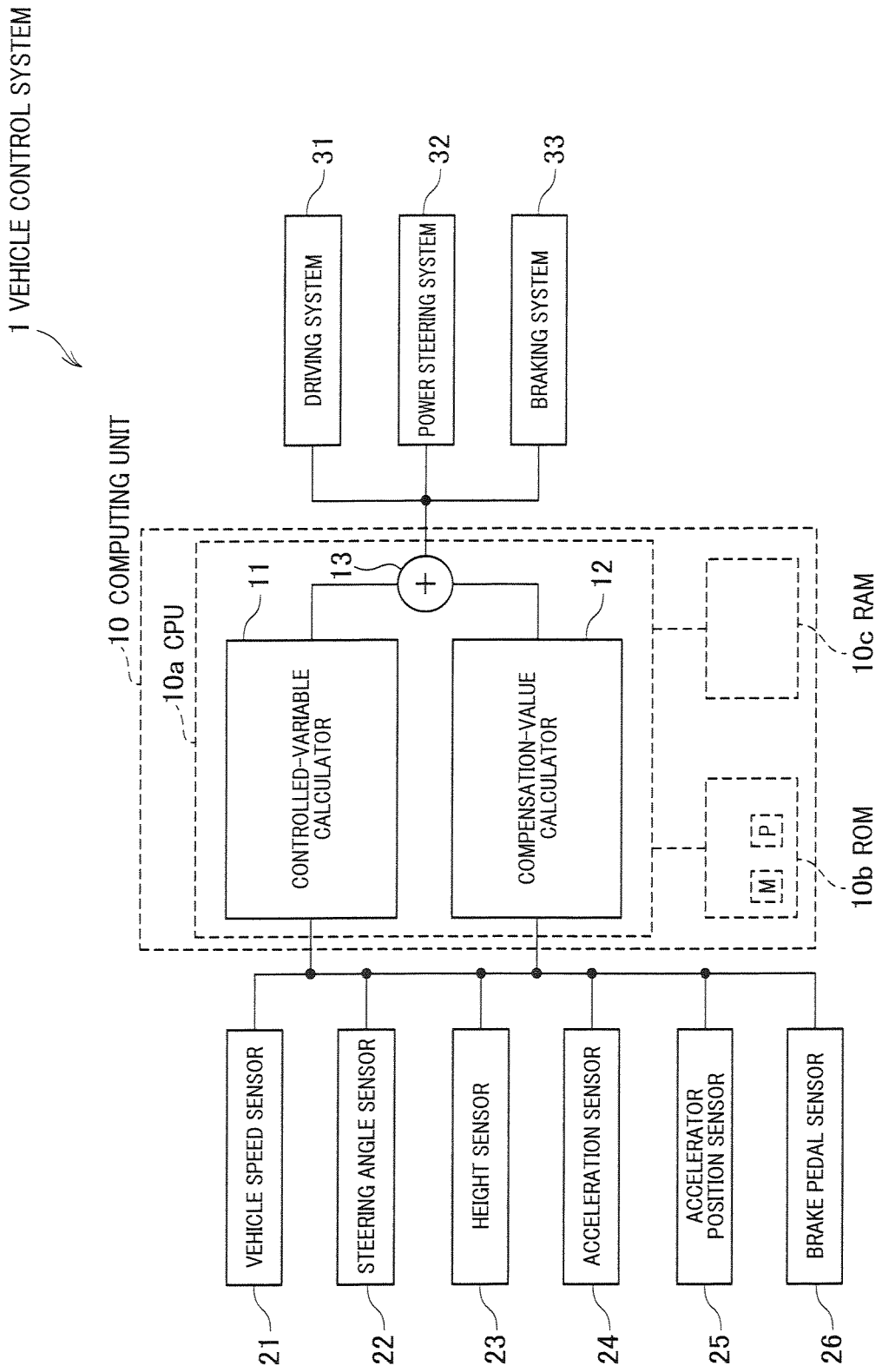
FIG. 1 is a block diagram schematically illustrating an example of the overall structure of a vehicle control system according to an embodiment of the present disclosure.

An example of the overall structure of a vehicle control system 1 according to an embodiment of the present disclosure is disclosed as a block diagram in FIG. 1.

The vehicle control system 1 is for example installed in a vehicle, such as a motor vehicle, and operative to control the dynamics of the vehicle. Particularly, the vehicle control system 1 according to this embodiment has functions of controlling a non-suspended portion of the vehicle to reduce vibrations, improve the response of the unsprung portion, and reduce disturbances. The non-suspended portion includes a front-wheel suspension, a rear-wheel suspension, a drivetrain, and a steering transmission mechanism of the vehicle.

Specifically, referring to FIG. 1, the vehicle control system 1 is comprised of a computing unit 10, various sensors 21 to 26 communicably connected to the computing unit 10, and controlled objects 31 to 33 communicably connected to the computing unit 10. The various sensors 21 to 26 include a vehicle speed sensor 21, a steering angle sensor 22, a height sensor 23, an acceleration sensor 24, an accelerator position sensor 25, and a brake pedal sensor 26.

The vehicle speed sensor 21 is provided for each wheel of the vehicle and operative to measure the rotating speed of a corresponding wheel. The vehicle speed sensor 21 is also operative to output, to the computing unit 10, a measurement signal indicative of the measured rotating speed of a corresponding wheel. In this embodiment, the vehicle is a four-wheel vehicle, and the vehicle speed sensor 21 is provided for each of the four wheels. Note that the front wheels of the vehicle are steering wheels, and the rear wheels are driving wheels.

The steering angle sensor 22 is provided for each front wheel and operative to measure a current steering angle of a corresponding front wheel. The steering angle sensor 22 is also operative to output, to the computing unit 10, a measurement signal indicative of the measured current steering angle of a corresponding front wheel.

The height sensor 23 is located close to each wheel of the vehicle and operative to measure a height of the vehicle. The height sensor 23 is also operative to output, to the computing unit 10, a measurement signal indicative of the measured height of the vehicle.

The acceleration sensor 24 is operative to measure acceleration or deceleration being applied to the vehicle, and to output, to the computing unit 10, a measurement signal indicative of the measured acceleration or deceleration.

The accelerator position sensor 25 is operative to measure a current position of an accelerator pedal of the vehicle operable by a driver and to output, to the computing unit 10, a measurement signal indicative of the measured position of the accelerator pedal.

The brake pedal sensor 26 is operative to operative to measure a pressure applied to a brake pedal of the vehicle as a manipulated variable of driver's deceleration for the vehicle, and operative to output, to the computing unit 10, a measurement signal indicative of the measured pedal pressure.

As the controlled objects 31 to 33, the vehicle control system 1 according to this embodiment is equipped with a driving system 31, a power steering system 32, and a braking system 33.

The driving system 31 includes a power source having an output shaft and including at least one of an internal combustion engine and a motor, and a drivetrain including a drive axle, a torque converting mechanism, and so on, and coupled between the output shaft of the power source and the driving wheels. The driving system 31 is designed to generate drive torque, i.e. drive-axle torque, and transfer the drive torque to the driving wheels.

The power steering system 32 includes a motor having an output shaft and a steering mechanism coupled between the output shaft of the motor and a steering wheel of the vehicle. The power steering system 32 is designed to generate assist torque that assists the driver's turning effort of the steering wheel.

The braking system 33 includes a power brake, an anti-lock brake system, an actuator, and a braking device provided for each wheel. The power brake is coupled between the brake pedal and the actuator, and operative to increase the pressure of the brake pedal, and transfer the increased pressure of the brake pedal to the actuator. The actuator is designed to transfer, to the braking device for each wheel, hydraulic fluid according to the increased pressure of the brake pedal. The braking device is designed to slow or stop a corresponding wheel using the hydraulic fluid. The anti-lock brake system is mechanically coupled to the actuator and operative to control the pressure of the hydraulic fluid to be transferred to the braking device for each wheel so as to prevent any wheel from locking up.

The computing unit 10 is designed as, for example, a normal microcomputer circuit consisting of, for example, a CPU 10a, a ROM 10b, and a RAM 10c, an IO (Input and output) interface, and so on.

The CPU 10a of the computing unit 10 is designed to perform various tasks in accordance with programs stored in the ROM 10b and/or programs loaded in the RAM 10c. Particularly, a plurality of models M, that is, mathematical, functional, and/or program representation of dynamic characteristics of a plurality of components of the vehicle, such as the wheels (their tires), suspension arms (lower control arms), and spring dampers, used for various computations by the CPU 10a are stored beforehand in the ROM 10b. That is, the plurality of components are configured to move in association with control of the controlled objects 31 to 33. The models include various constants correlated with the dynamics of the vehicle, such as a complete vehicle curb mass, spring constants, damper constants, and so on. Note that the suspension arms of each of a front-wheel suspension system and a rear-wheel suspension system suspend the chassis (body) of the vehicle above corresponding wheels. The spring dampers are coupled between the vehicle body and the corresponding suspension arms. That is, the suspension arms and the spring dampers constitute a front-wheel or rear-wheel suspension system (assembly) that cushions the vehicle body from the bumps and shocks caused by the corresponding wheels.

Specifically, the computing unit 10 functionally includes a controlled-variable determiner 11, a compensation value calculator 12, and a target value calculator 13. In other words, at least one program P stored in, for example, the ROM 10b causes the CPU 10a to function as the controlled-variable calculator 11, the compensation value calculator 12, and the adder 13. In FIG. 1, the modules 11, 12, and 13 are functionally included in the single microcomputer, but they can be functionally included in a plurality of microcomputers. Each of the modules 11 to 13 can be designed as a hardwired logic circuit, a programmed logic circuit, or a combination of hardwired and programmed logic hybrid circuits.

The controlled-variable determiner 11 is operative to receive the measurement signals outputted from the sensors 21 to 26, and determine, based on the measurement signals, values of predetermined controlled variables required for controlling the controlled objects 31 to 33.

For example, drive torque to be transferred to the driving wheels is a controlled variable for the driving system 31, a steering force, such as steering torque, to be given to the steering wheel as the sum of the assist torque and the driver's turning force is a controlled variable for the power steering system 32, and braking force, such as a pressure of hydraulic fluid to be transferred to the braking device for each wheel, is a controlled variable for the braking system 33.

The compensation value calculator 12 is operative to estimate the dynamics of the plurality of components that move in association with control of the controlled objects 31 to 33. The compensation value calculator 12 is also operative to calculate compensation values for the values of the controlled variables determined by the controlled-variable determiner 11; these compensation values are to optimize the dynamics of the plurality of components.

The target value calculator 13 is operative to calculate a target value of each of the controlled variables for the respective controlled objects 31 to 33. Specifically, the target value calculator 13 adds the compensation value for each of the controlled variables calculated by the compensation value calculator 12 to the value of a corresponding one of the controlled variables determined by the controlled-variable determiner 11, thus calculating the target value of each of the controlled variables for the respective controlled objects 31 to 33. The target value calculator 13 can subtract the compensation value for each of the controlled variables calculated by the compensation value calculator 12 from the value of a corresponding one of the controlled variables determined by the controlled-variable determiner 11, thus calculating the target value of each of the controlled variables for the respective controlled objects 31 to 33.

Then, the target value calculator 13 is operative to output, to each of the controlled objects 31 to 33, the target value of a corresponding one of the controlled variables.

Next, an example of the functional structure of the compensation value calculator 12 will be described in detail hereinafter.

Figure 2:
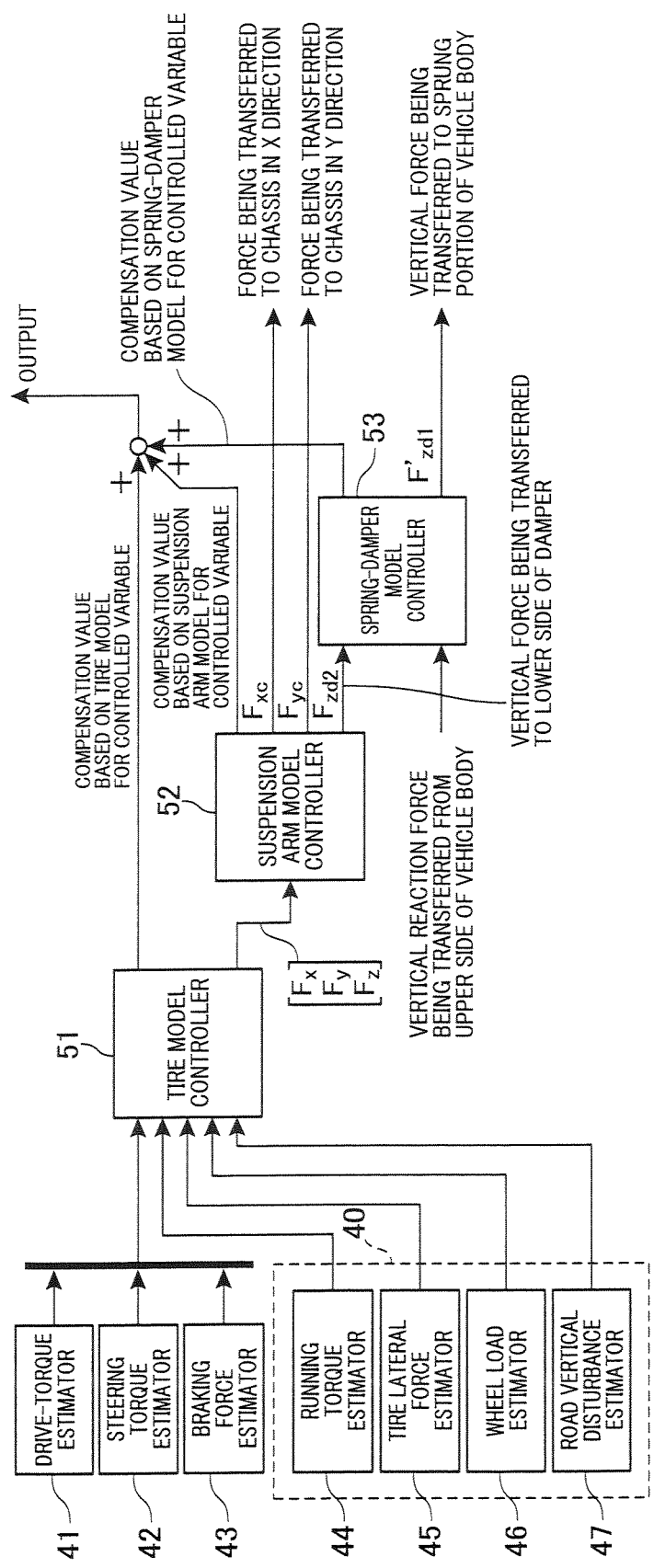
FIG. 2 is a block diagram schematically illustrating operations of a tire model controller illustrated in FIG. 1.

Referring to FIG. 2, the compensation-value calculator 12 functionally includes an external force estimator 40, a drive torque estimator 41, a steering force estimator 42, a braking force estimator 43, a tire model controller 51, a suspension-arm model controller 52, and a spring-damper model controller 53.

The drive-torque estimator 41 is operative to estimate a value of the drive torque being applied to the drive axel using the output of the driving system 31. For example, if the vehicle is driven by the internal combustion engine, referred to simply as the engine, the drive-torque estimator 41 estimates a value of the drive torque being applied to the drive axel according to internal parameters of the engine, such as the current position of the accelerator pedal, the rotational speed of the engine, and the quantity of intake air into the engine. In addition, if the vehicle is driven by the motor, the drive-torque estimator 41 estimates a value of the drive torque being applied to the drive axel according to present value of drive currents of the motor.

The steering force estimator 42 is operative to continuously receive the measurement signal from the steering angle sensor 22 to calculate, based on the variation in the steering angle represented by the measurement signal, a steering speed and a steering acceleration. The steering force estimator 42 is also operative to estimate, based on the steering speed and steering acceleration, the driver's turning force of the steering wheel and the assist torque generated by the power steering system 32. Then, the steering force estimator 42 is operative to estimate a current value of the steering force to be applied to the steering wheel as the sum of the driver's turning force of the steering wheel and the assist torque.

The running force estimator 43 is operative to estimate, based on the measurement signals from the vehicle speed sensor 21 and the brake pedal sensor 26, a current value of the braking force being applied to each brake device.

The tire-model controller 51 is operative to estimate a force being exerted on each tire (each wheel) using models M associated with each tire (wheel) stored in the ROM 10b. The suspension-arm model controller 52 is operative to estimate a force being applied to each suspension arm using models M associated with each suspension arm stored in the ROM 10b. The spring-damper model controller 53 is operative to estimate a force being exerted on each spring damper using models M associated with each spring damper stored in the ROM 10b.

Each of the models M is designed to allow a corresponding controller to estimate the dynamics of a given part of a corresponding object (a tire, a suspension arm, or a spring damper). The models M have a common coordinate system with a common origin coordinate. Particularly, the common origin coordinate of the common coordinate system of the models M for one wheel is set to an intersection point of the center line of rotation of the corresponding wheel and the plane of rotation of the corresponding wheel passing the center of a portion of the corresponding tire on a corresponding ground (road).

For example, in this embodiment, the x-axis of the common coordinate system is along the intersection line of the tire-plane and a flat and horizontal ground on which a tire is vertically loaded. The z-axis is perpendicular to the ground, and the y-axis makes the coordinate system a right-hand triad (see FIGS. 5A to 5C and the like). The ground on which a tire is located will be referred to as a tireprint. In other words, the x-axis direction corresponds to the longitudinal direction of the vehicle, the y-axis direction corresponds to the vehicle width direction (horizontal direction), and the z-axis direction corresponds to the vehicle height direction (vertical direction).

Note that the operations of the controllers 51, 52, and 53 will be described in detail later.

The external force estimator 40 includes a running resistance estimator 44, a tire lateral force estimator 45, a wheel load estimator 46, and a road vertical disturbance estimator 47.

The running resistance estimator 44 is operative to estimate, based on the current rotating speed of each wheel, a running resistance being exerted on the wheels in their turning directions. The tire lateral force estimator 45 is operative to estimate a lateral force being applied to the tire of each wheel using the current steering angle and the current rotating speed of each wheel. The wheel load estimator 46 is operative to estimate load on each wheel including the dynamic load shift on a corresponding wheel. The road vertical disturbance estimator 47 is operative to estimate vertical disturbance being applied to each wheel due to the roughness of a corresponding road surface.

Figure 3:
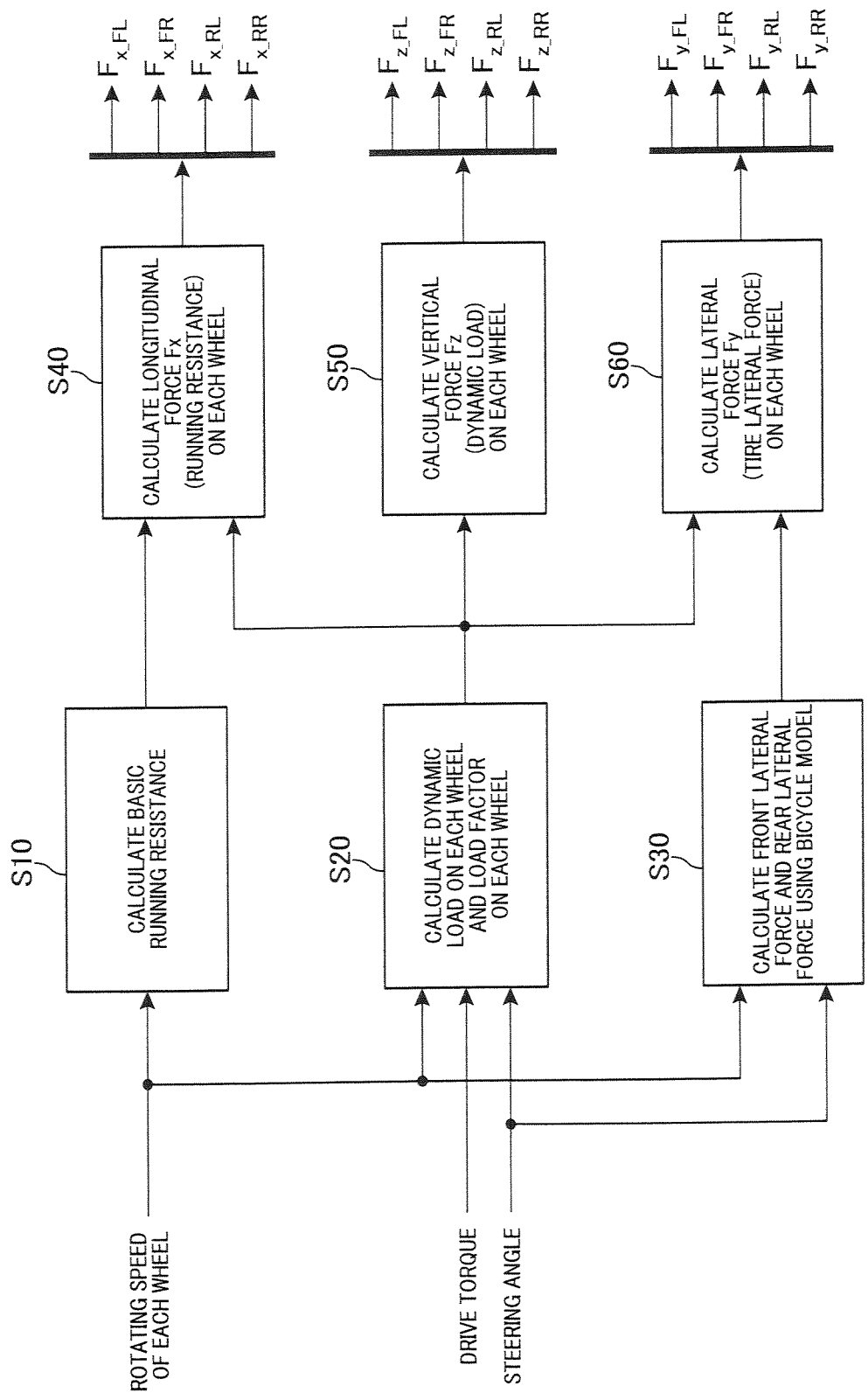
FIG. 3 is a flowchart schematically illustrating how to estimate various types of external forces by an external force estimator illustrated in FIG. 2.

Next, how to estimate the various types of external forces by the external force estimator 40 will be described hereinafter with reference to FIG. 3.

When estimating the various types of force, the external force estimator 40 calculates a base running resistance for each wheel in step S10.

The operation in step S10 corresponds to a function of the running resistance estimator 44. Specifically, the running resistance estimator 44 estimates a base running resistance of each wheel in its turning direction using the rate of change of the difference between the rotating speed of each wheel and the average rotating speed of the four wheels.

For example, in step S10, the resistance estimator 44 calculates the average rotating speed $\omega_{w\_ave}$ of the four wheels using the following equation [1]:

$$\omega_{w\_ave} = \frac{1}{4}(\omega_{w\_}FL + \omega_{w\_}FR + \omega_{w\_}RL + \omega_{w\_}RR)[\text{rpm}] \quad [1]$$

where $\omega_{w\_}FL$ represents the rotating speed of the left front wheel FL, $\omega_{w\_}FR$ represents the rotating speed of the right front wheel FR, $\omega_{w\_}RL$ represents the rotating speed of the left rear wheel RL, and $\omega_{w\_}RR$ represents the rotating speed of the right rear wheel RR.

The resistance estimator 44 calculates base running resistances $F_{x\_base\_ij}$ of the respective wheels FL, FR, RL, and RR in their turning directions using the average rotating speed $\omega_{w\_ave}$ in accordance with the following equations [2] in step S10:

$$F_{x\_base\_ij} = M r_t \frac{2\pi}{60} G_{LPF1}\left[G_{LPF}\left\{\frac{d}{dt}(\omega_{w\_ij} - \omega_{w\_ave})\right\}\right] \quad [2]$$

where ij represents FL, FR, RL, and RR, M represents the mass of the vehicle, $r_t$ represents the radius of each wheel, and $G_{LPF}$ and $G_{LPF1}$ represent transfer functions of low-pass filters having respective cutoff frequencies f and $f_1$ each being approximately 40 Hz.

That is, the equation [2] means that any frequencies higher than the cutoff frequency f or $f_1$ are ignored.

Note that the following equation [3] between input u(k) output y(k) for calculating a discrete low-pass filter is shown below:

$$y(k) = \frac{t_s}{t_s + (1/\pi f_1)}\{u(k) + u(k-1)\} - \frac{t_s - (1/\pi f_1)}{t_s + (1/\pi f_1)}y(k-1) \quad [3]$$

where u(k) represents k-th input to the low-pass filter, u(k−1) represents (k−1)-th input to the low-pass filter, y(k) represents k-th output of the low-pass filter, y(k−1) represents (k−1)-th output of the low-pass filter, $f_1$ is a cutoff frequency, and $t_s$ represents a sampling period.

Next, the external force estimator 40 calculates the dynamic load on each wheel in step S20.

The operation in step S20 corresponds to a function of the wheel load estimator 46. Specifically, the wheel load estimator 46 performs the following steps S110 to S160 illustrated in FIG. 4 in calculating the dynamic load shift on each wheel.

Referring to FIG. 4, the wheel load estimator 46 extracts AC (Alternating Current) components from the estimated value of the drive torque estimated by the drive-torque estimator 41 as k-th input u(k) in step S110. Specifically, the wheel load estimator 46 extracts low frequency AC components, such as frequency components within 1 to 30 Hz, using a band-pass filter $G_{BPF}$ determined by combination of the low-pass filters $G_{LPF1}$ and $G_{LPF2}$ having different cutoff frequencies $f_1$ and $f_2$; ($f_2 > f_1$); the low-pass filter $G_{LPF1}$ is represented by the following equations [4A] and [5A], and the low-pass filter $G_{LPF2}$ is represented by the following equations [4B] and [5B]:

$$G_{LPF1}(z) = \frac{1}{1 + \frac{2T_1}{t_s}\frac{z-1}{z+1}} = \frac{\frac{t_s}{t_s + 2T_1}(1+z^{-1})}{1 + \frac{t_s - 2T_1}{t_s + 2T_1}z^{-1}} = \frac{y(k)}{u(k)} \quad [4A]$$

$$y(k) = \frac{t_s}{t_s + 2T_1}\{u(k) + u(k-1)\} - \frac{t_s - 2T_1}{t_s + 2T_1}y(k-1) \quad [5A]$$
$$= \frac{t_s}{t_s + (1/\pi f_1)}\{u(k) + u(k-1)\} - \frac{t_s - (1/\pi f_1)}{t_s + (1/\pi f_1)}y(k-1)$$

$$G_{LPF2}(z) = \frac{1}{1 + \frac{2T_s}{t_s}\frac{z-1}{z+1}} \quad [4B]$$
$$= \frac{\frac{t_s}{t_s + 2T_2}(1+z^{-1})}{1 + \frac{t_s - 2T_2}{t_s + 2T_2}z^{-1}}$$
$$= \frac{y(k)}{u(k)}$$

$$y(k) = \frac{t_s}{t_s + 2T_2}\{u(k) + u(k-1)\} - \frac{t_s - 2T_2}{t_s + 2T_2}y(k-1) \quad [5B]$$
$$= \frac{t_s}{t_s + (1/\pi f_2)}\{u(k) + u(k-1)\} - \frac{t_s - (1/\pi f_2)}{t_s + (1/\pi f_2)}y(k-1)$$

where $T_1$ represents a cutoff period of the low-pass filter $G_{LPF1}$, and $T_2$ represents a cutoff period of the low-pass filter $G_{LPF2}$.

The band-pass filter $G_{BPF}$ determined by the combination of the low-pass filters $G_{LPF1}$ and $G_{LPF2}$ can be expressed by the following equation:

$$G_{BPF} = G_{LPF2} \times (1 - G_{LPF1})$$

That is, the band-pass filter $G_{BPF}$ is designed to pass therethrough only low-frequency AC components within the range from $f_1$ to $f_2$.

Next, the wheel load estimator 46 calculates a pitch angle $\theta_p$ of the vehicle body using the following equations [6], [6A], and [7] in step S120:

$$(h_{cg} - r_t)M\alpha_x + (h_{cg} - r_t)\theta_p Mg = 2L_f\theta_p K_{sf}L_f + 2L_f\theta_p K_{sr}L_r \quad [6]$$

$$M\alpha_x = \Delta T_w/r_t \quad [6A]$$

$$\theta_p = \frac{(h_{cg}/r_t - 1)}{\{2L_f^2 K_{sf}L_f + 2L_f^2 K_{sr} - (h_{cg} - r_t)Mg\}}\Delta T_w = k_p \Delta T_w \quad [7]$$

where M represents the mass of the vehicle [kg], g represents the acceleration of gravity [m/s²], $r_t$ represents the radius of each wheel [m], $h_{cg}$ represents the height of the center of gravity of the vehicle [m], $K_{sf}$ represents spring constant of the front-wheel suspension system, $K_{sr}$ represents spring constant of the rear-wheel suspension system, $L_f$ represents the distance between a steering spindle of the vehicle and the center of gravity of the vehicle [m], $L_r$ represents the distance between a rear axle of the vehicle and the center of gravity of the vehicle [m], $\alpha_x$ represents an acceleration being applied to the vehicle in the longitudinal direction of the vehicle, and $\Delta T_w$ represents the variation of the actual drive torque of the drive axel. The actual drive torque of the drive axel can be calculated based on the value of the drive torque estimated by the drive-torque estimator 41, a torque amplification factor by the torque converting mechanism, and the radius $r_t$ of each wheel.

Figure 5A:
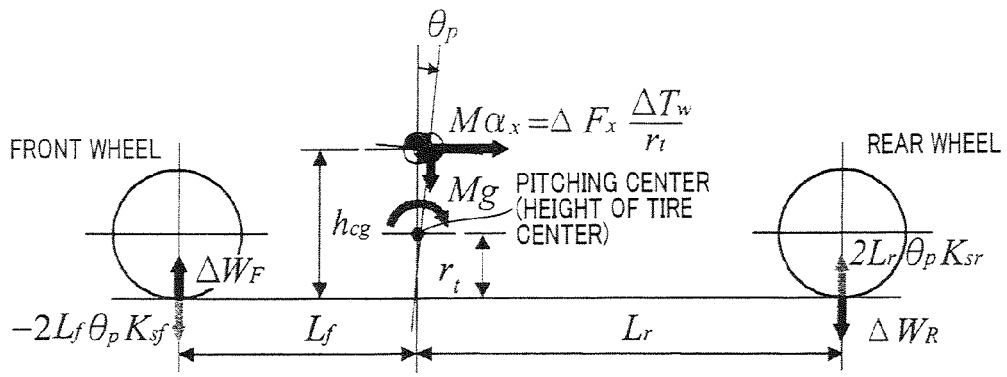
FIG. 5A is a view schematically illustrating a model of a vehicle for obtaining a pitch angle of the vehicle body.

FIG. 5A schematically illustrates a model of the vehicle for obtaining the pitch angle $\theta_p$ of the vehicle body. In the model, a center of pitching of the vehicle body is assumed to be equal to the height of the center of each wheel. Referring to FIG. 5A, the equations [6] and [7] calculate the pitch angle $\theta_p$ of the vehicle body with respect to the variation of drive force ($\Delta T_w/r_t$) according to the balance of moment around the center of the pitching while the vehicle is travelling. Particularly, the equations [6] and [7] are based on the assumption that the vehicle is travelling in steady state, and the fact that, under this assumption, the drive torque is identical to the total running resistance to the vehicle.

Specifically, in the equation [6], $(h_{cg} - r_t)M\alpha_x$ represents acceleration moment based on the drive torque, $(h_{cg} - r_t)\theta_p Mg$ represents moment of the gravity assuming that $\sin \theta_p$ is regarded as $\theta_p$, $2L_f\theta_p K_{sf}L_f$ represents moment based on an elastic force of the front suspension, and $2L_r\theta_p K_{sr}L_r$ represents moment based on an elastic force of the rear suspension. The sum of the moment $(h_{cg} - r_t)M\alpha_x$ and the moment $(H_{cg} - r_t)\theta_p Mg$ is identical to the sum of the moment $2L_f\theta_p K_{sf}L_f$ and the moment $2L_r\theta_p K_{sr}L_r$.

Subsequently, the wheel load estimator 46 calculates a value of the longitudinal load shift on each wheel in step S130. Specifically, the wheel load estimator 46 calculates a value $\Delta W_{x\_FL}$ of the longitudinal load shift on the left front wheel FL, and a value $\Delta W_{x\_FR}$ of the longitudinal load shift on the right front wheel FR in accordance with the following equation [8]:

$$\Delta W_{x\_FL} = \Delta W_{x\_FR} = -L_f\theta_p K_{sf}[N] \quad [8]$$

Similarly, the wheel load estimator 46 calculates a value $\Delta W_{x\_RL}$ of the longitudinal load shift on the left rear wheel RL, and a value $\Delta W_{x\_RL}$ of the longitudinal load shift on the right rear wheel RR in accordance with the following equation [9]:

$$\Delta W_{x\_RL} = \Delta W_{x\_RR} = -L_r\theta_p K_{sr}[N] \quad [9]$$

Next, the wheel load estimator 46 calculates a roll angle $\theta_{rf}$ of the vehicle body around a predetermined front roll center of the vehicle body and a roll angle $\theta_{rr}$ of the vehicle body around a predetermined rear roll center of the vehicle body in step S140. Specifically, the wheel load estimator 46 uses the vehicle speed V and the front-wheel steering angle δ of the vehicle measured by the steering angle sensor to thereby calculate the roll angle $\theta_{rf}$ of the vehicle body around the front roll center according to the balance of moment around the front roll center while the vehicle is turning in steady-state circular motion. Similarly, the wheel load estimator 46 uses the vehicle speed V and the front-wheel steering angle δ of the vehicle measured by the steering angle sensor to thereby calculate the roll angle $\theta_{rr}$ of the vehicle body around the rear roll center according to the balance of moment around the rear roll center while the vehicle is turning in steady-state circular motion. The roll angle $\theta_{rf}$ of the vehicle body around the front roll center will be referred to as a front roll angle $\theta_{rf}$, and the roll angle $\theta_{rr}$ of the vehicle body around the rear roll center will be referred to as a rear roll angle $\theta_{rf}$.

Note that the vehicle speed V represents an absolute speed of the vehicle body, which can be calculated as the average of the rotating speeds of the left and right rolling wheels of the vehicle measured by the vehicle speed sensor 21, can be actually detected by a GPS (Global Positioning System) detector, or can be obtained using one of known vehicle-speed detecting methods.

Figure 5B:
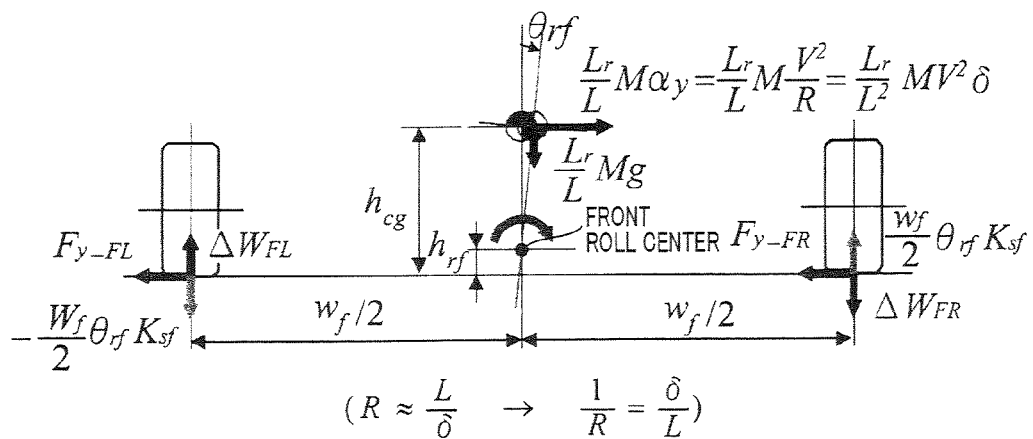
FIG. 5B is a view schematically illustrating the balance of moment around a front roll center in a model of the vehicle.
Figure 5C:
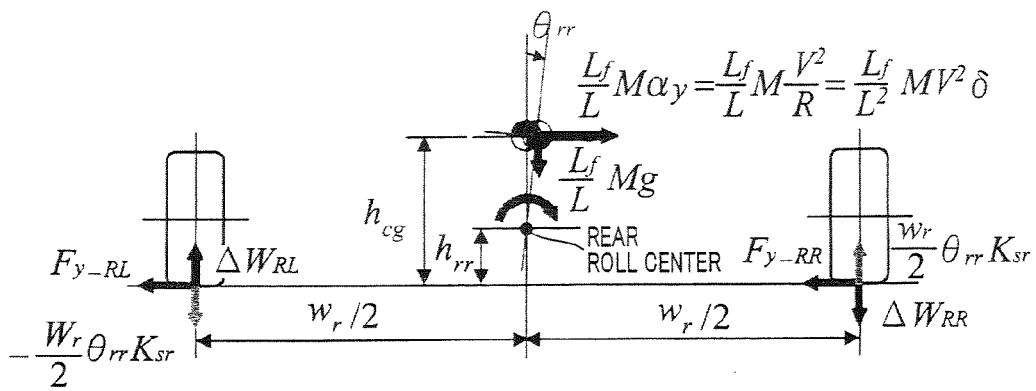
FIG. 5C is a view schematically illustrating the balance of moment around a rear roll center in a model of the vehicle.

FIG. 5B schematically illustrates the balance of moment around the front roll center in a model of the vehicle, and FIG. 5C schematically illustrates the balance of moment around the rear roll center in a model of the vehicle.

Specifically, the wheel load estimator 46 calculates the front roll angle $\theta_{rf}$ using the following equations [10] and [11] given based on the model illustrated in FIG. 5B, and calculates the rear roll angle $\theta_{rr}$ using the following equations [12] and [13] given based on the model illustrated in FIG. 5C:

$$(h_{cg}-h_{rf})\frac{L_r}{L}M\frac{V^2}{R}+(h_{cg}-h_{rf})\theta_{rf}\frac{L_r}{L}Mg = 2\frac{w_f}{2}\left(\frac{w_f}{2}\theta_{rf}K_{sf}\right) \quad [10]$$

$$\theta_{rf}=\frac{(h_{cg}-h_{rf})\frac{L_r}{L^2}M}{\left\{\frac{w_f^2}{2}K_{sf}-(h_{cg}-h_{rf})\frac{L_r}{L}Mg\right\}}V^2\delta = k_{rf}V^2\delta[\text{rad}] \quad [11]$$

$$(h_{cg}-h_{rr})\frac{L_f}{L}M\frac{V^2}{R}+(h_{cg}-h_{rr})\theta_{rr}\frac{L_f}{L}Mg = 2\frac{w_r}{2}\left(\frac{w_r}{2}\theta_{rr}K_{sr}\right) \quad [12]$$

$$\theta_{rr}=\frac{(h_{cg}-h_{rr})\frac{L_f}{L^2}M}{\left\{\frac{w_r^2}{2}K_{sr}-(h_{cg}-h_{rr})\frac{L_f}{L}Mg\right\}}V^2\delta = k_{rr}V^2\delta[\text{rad}] \quad [13]$$

where $h_{rf}$ represents the height of the front roll center, $h_{rr}$ represents the height of the rear roll center, $$\frac{w_f}{2}$$

represents half of the front tread, i.e. the distance between the front wheels, $$\frac{w_r}{2}$$

represents half of the rear tread, i.e. the distance between the rear wheels, and L represents the wheelbase of the vehicle, expressed as "$L_f+L_r$".

As a result, the front roll angle $\theta_{rf}$ and the rear roll angle $\theta_{rr}$ are obtained in step S140.

Next, the wheel load estimator 46 calculates a value of the lateral load shift on each wheel according to either the front roll angle $\theta_{rf}$ and the rear roll angle $\theta_{rr}$ in step S150. Specifically, the wheel load estimator 46 calculates a value $\Delta W_{y\_FL}$ of the lateral load shift on the left front wheel FL, a value $\Delta W_{y\_FR}$ of the lateral load shift on the right front wheel FL, a value $\Delta W_{y\_RL}$ of the lateral load shift on the left rear wheel RL, a value $\Delta W_{y\_RR}$ of the lateral load shift on the right rear wheel RR in accordance with the following equations [14] to [17]:

$$\Delta W_{y\_FL} = -\frac{w_f}{2}\theta_{rf}K_{sf}[N] \quad [14]$$

$$\Delta W_{y\_FR} = \frac{w_f}{2}\theta_{rf}K_{sf}[N] \quad [15]$$

$$\Delta W_{y\_RL} = -\frac{w_f}{2}\theta_{rr}K_{sr}[N] \quad [16]$$

$$\Delta W_{y\_RR} = \frac{w_f}{2}\theta_{rr}K_{sr}[N] \quad [17]$$

Next, the wheel load estimator 46 calculates the dynamic load $W_{\_ij}$ on each wheel using the longitudinal load shift of each wheel and the lateral load shift on each wheel in accordance with the following equation [18]:

$$W_{\_ij}=W_{o\_ij}+\Delta W_{x\_ij}+\Delta W_{y\_ij}[N] \quad [18]$$

where ij represents FL, FR, RL, and RR.

In the equation [18], $W_{o\_ij}$ the static load on each wheel.

Specifically, the total load $W_o$ on the four wheels is given to the following equation [19]:

$$W_o=Mg[N] \quad [19]$$

Thus, the static load on each front wheel is given to the following equation [20]:

$$W_{o\_fL} = W_{o\_fR} = \frac{1}{2}\frac{L_r}{L}W_o[N] \quad [20]$$

Similarly, the static load on each rear wheel is given to the following equation [21]:

$$W_{o\_RL} = W_{o\_RR} = \frac{1}{2}\frac{L_f}{L}W_o[N] \quad [21]$$

That is, the wheel load estimator 46 adds the static load on each of the front and rear wheels expressed in the equations [20] and [21] to the longitudinal load shift and the lateral load shift on a corresponding one of the front and rear wheels expressed in the equations [14] to [17] to thereby obtain the dynamic load $W_{\_ij}$ on each wheel.

In step S160, the wheel load estimator 46 calculates the load factor $kW_{\_ij}$ of each wheel by dividing the dynamic load on each wheel by the total load $W_o$ in accordance with the following equation [22]:

$$kW_{\_ij} = \frac{W_{\_ij}}{W_o} = \left(\frac{1}{W_o}\right)*W_{\_ij} \quad [22]$$

where ij represents FL, FR, RL, and RR.

As a result, the dynamic load $W_{\_ij}$ on each wheel and the load factor $kW_{\_ij}$ of each wheel are obtained in step S20.

Returning to FIG. 3, the external force estimator 40 calculates a tire lateral force based on a bicycle model of the vehicle in order to simplify the dynamics of the vehicle in step S30.

The operation in step S30 corresponds to a function of the tire lateral force estimator 45.

Figure 6A:
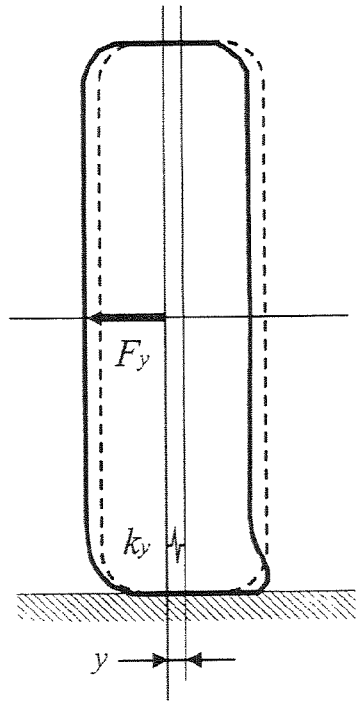
FIG. 6A is a front elevational view of a tire, which schematically illustrates lateral tire deformation according to this embodiment.
Figure 6B:
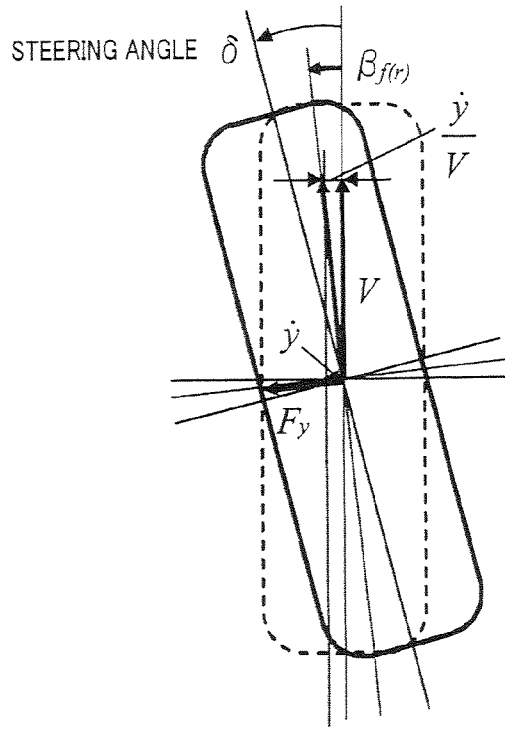
FIG. 6B is a top plan view of a tire, which schematically illustrates a steering angle and a slip angle of a tire according to this embodiment.
Figure 6C:
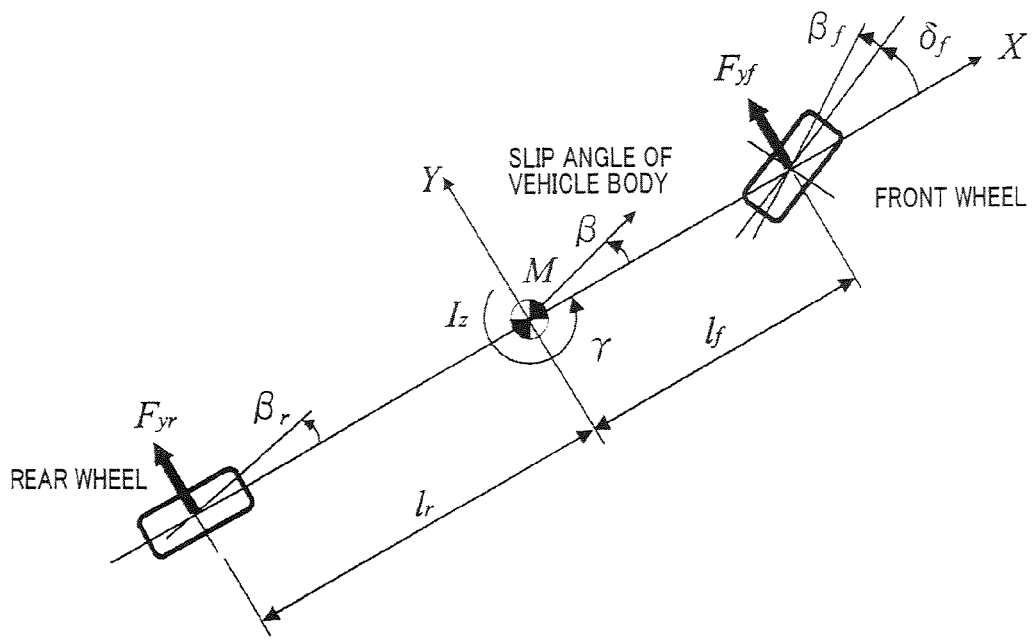
FIG. 6C is a view schematically illustrating a bicycle model according to this embodiment.

FIGS. 6A and 6B schematically illustrate an example of physical models of tires on the basis of the bicycle model, and FIG. 6C schematically illustrates the bicycle model. Particularly, FIG. 6A is a front elevational view of a tire, which schematically illustrates lateral tire deformation, and FIG. 6B is a top plan view of a tire, which schematically illustrates a steering angle and a slip angle of a tire.

When lateral stiffness, in other words, lateral rigidity of a tire is expressed as $k_y$, and a lateral force being exerted on a tire in the y-axis is expressed as $F_y$, the following motion equations [23A], [23B] are obtained based on the tire models illustrated in FIGS. 6A and 6B:

$$F_y = -C_p\left(\beta_{f(r)} - \frac{\dot{y}}{V}\right) \quad [23A]$$

$$F_y = -k_y y \quad [23B]$$

where y represents a deformation amount of a tire in the y-axis, • over a variable stands for the derivative of the variable with respect to time, $\beta_{f(r)}$ represents a slip angle of a corresponding tire (a front tire or a rear tire), and $C_p$ represents cornering power exerted on a corresponding wheel (tire).

From the equations [23A] and [23B], the following relational expressions are derived:

$$F_y = -C_p\left(\beta_{f(r)} - \frac{1}{k_y V}\dot{F}_y\right) \quad [24]$$

$$\frac{C_p}{k_y V}\dot{F}_y + F_y = -C_p \beta_{f(r)} \quad [25]$$

In addition, the following equations [26] to [29] are obtained based on the model illustrated in FIG. 6C:

$$MV(\dot{\beta} + \gamma) = 2F_{yf} + 2F_{yr} \quad [26]$$

$$I_z \dot{\gamma} = 2L_f F_{yf} - 2L_r F_{yr} \quad [27]$$

$$\beta_f = \beta + \frac{L_f}{V}\gamma - \delta_f \quad [28]$$

$$\beta_r = \beta - \frac{L_r}{V}\gamma - \delta_r \quad [29]$$

where $\beta$ represents a slip angle of the center of gravity of the vehicle, $\gamma$ represents a yaw rate of the vehicle, $F_{yf}$ represents a lateral force being exerted on a front tire in the y-axis, $F_{yr}$ represents a lateral force being exerted on a rear tire in the y-axis, $I_z$ represents yaw moment of inertia of the vehicle, $\delta_f$, which is identical to $\delta$, represents the front-wheel steering angle, and $\delta_r$ represents the rear-wheel steering angle.

Deformation of the equations [26] to [29] obtains the following equations [31] to [34]:

$$\dot{\beta} = -\gamma + \frac{2}{MV}F_{yf} + \frac{2}{MV}F_{yr} \quad [31]$$

$$\dot{\gamma} = \frac{2L_f}{I_z}F_{yf} - \frac{2L_f}{I_z}F_{yr} \quad [32]$$

$$\dot{F}_{yf} = -k_{yf}V\beta - k_{yf}L_f\gamma - \frac{k_{yf}}{C_{pf}}F_{yf} + k_{yf}V\delta_f \quad [33]$$

$$\dot{F}_{yr} = -k_{yr}V\beta - k_{yr}L_r\gamma - \frac{k_{yr}}{C_{pr}}F_{yr} + k_{yr}V\delta_r \quad [34]$$

where $C_{pf}$ represents cornering power being exerted on a front wheel (tire), and $C_{pr}$ represents cornering power being exerted on a rear wheel (tire).

At that time, the following state variables $x_1$ to $x_4$, $u_1$, and $u_2$ are defined as follows:

$$x_1 = \beta, x_2 = \gamma, x_3 = F_{yf}, x_4 = F_{yr}, u_1 = \delta_f, u_2 = \delta_r \quad [35]$$

Using the state variables $x_1$ to $x_4$, $u_1$, and $u_2$ allows the following relational equations [36] to be obtained:

$$\dot{x}_1 = \dot{\beta} = -\gamma + \frac{2}{MV}F_{yf} + \frac{2}{MV}F_{yr} \quad [36]$$
$$= a_2 x_2 + a_3 x_3 + a_4 x_4$$

$$\dot{x}_2 = \dot{\gamma} = \frac{2L_f}{I_z}F_{yf} - \frac{2L_f}{I_z}F_{yr}$$
$$= b_3 x_3 + b_4 x_4$$

$$\dot{x}_3 = \dot{F}_{yf} = -k_{yf}V\beta - k_{yf}L_f\gamma - \frac{k_{yf}}{C_{pf}}F_{yf} + k_{yf}V\delta_f$$
$$= c_1 x_1 + c_2 x_2 + c_3 x_3 + p_1 u_1$$

$$\dot{x}_4 = \dot{F}_{yr} = -k_{yr}V\beta - k_{yr}L_r\gamma - \frac{k_{yr}}{C_{pr}}F_{yr} + k_{yr}V\delta_r$$
$$= d_1 x_1 + d_2 x_2 + d_4 x_4 = p_2 u_2$$

where $a_2 = -1$, $a_3 = 2/(MV)$, $a_4 = 2/(MV)$, $b_3 = 2L_f/I_z$, $b_4 = 2L_r/I_z$, $c_1 = -k_{yf}V$, $c_2 = -k_{yf}L_f$, $c_3 = -k_{yf}V/C_{pf}$, $d_1 = -k_{yr}V$, $d_2 = k_{yr}L_r$, $d_4 = -k_{yr}V/C_{pr}$, $p_1 = k_{yf}V$, and $p_2 = -k_{yr}V$.

The relational equations [36] can be expressed as the following state equations [37]:

$$\begin{bmatrix}\dot{x}_1\\\dot{x}_2\\\dot{x}_3\\\dot{x}_4\end{bmatrix} = \begin{bmatrix}0 & a_2 & a_3 & a_4\\0 & 0 & b_3 & b_4\\c_1 & c_2 & c_3 & 0\\d_1 & d_2 & 0 & d_4\end{bmatrix}\begin{bmatrix}x_1\\x_2\\x_3\\x_4\end{bmatrix} + \begin{bmatrix}0 & 0\\0 & 0\\p_1 & 0\\0 & p_2\end{bmatrix}\begin{bmatrix}u_1\\u_2\end{bmatrix} \quad [37]$$

In the equation [37], returning the parameters $x_1$ to $x_4$, $u_1$, and $u_2$ to the corresponding values $\beta$, $\gamma$, $F_{yf}$, $F_{yr}$, $\delta_f$, and $\delta_r$ allows the following equation [38] to be obtained:

$$\begin{bmatrix}\dot{\beta}\\\dot{\gamma}\\\dot{F}_{yf}\\\dot{F}_{yr}\end{bmatrix} = \begin{bmatrix}0 & -1 & \frac{2}{(MV)} & \frac{2}{(MV)}\\0 & 0 & \frac{2L_f}{I_z} & \frac{-L_r}{I_z}\\-k_{yf}V & -k_{yf}L_f & \frac{-k_{yf}V}{C_{pf}} & 0\\-k_{yr}V & -k_{yr}L_r & 0 & \frac{-k_{yr}}{C_{pr}}\end{bmatrix}\begin{bmatrix}\beta\\\gamma\\F_{yf}\\F_{yr}\end{bmatrix} + \begin{bmatrix}0 & 0\\0 & 0\\k_{yf}V & 0\\0 & k_{yr}V\end{bmatrix}\begin{bmatrix}\delta_f\\\delta_r\end{bmatrix} \quad [38]$$

The equation [38] shows that the using the steering angles ($\delta_f$, $\delta_r$) of the front wheel and the rear wheel of the bicycle model, the lateral rigidity $k_y$ of a tire, and the vehicle speed V allows calculation of the vehicle slip angle $\beta$, the yaw rate $\gamma$, the lateral force $F_{yf}$ being exerted on a front tire in the y-axis, and the lateral force $F_{yr}$ being exerted on a rear tire in the y-axis. The lateral force $F_{yf}$ exerted on a front tire in the y-axis will be referred to as a front lateral force $F_{yf}$, and the lateral force $F_{yr}$ being exerted on a rear tire in the y-axis will be referred to as a rear lateral force $F_{yr}$.

Returning to FIG. 3, the external force estimator 40 calculates a longitudinal force $F_{x\_ij}$ being exerted on each of the four wheels in step S40. The operation in step S40 corresponds to a function of the running force estimator 44.

Specifically, the external force estimator 40 multiplies the base running resistance $F_{x\_base\_ij}$ for each wheel (see the equation [2]) obtained in step S10 and the load factor $kW_{\_ij}$ of a corresponding wheel obtained in step S20 to thereby obtain the longitudinal force $F_{x\_ij}$ being exerted on each wheel in accordance with the following equation [41]:

$$F_{x\_ij} = kW_{\_ij} * F_{x\_base\_ij} [N] \quad [41]$$

where ij represents FL, FR, RL, and RR

That is, the longitudinal force $F_{x\_ij}$, in other words, running resistance, being exerted on each wheel is based on the longitudinal and lateral load shifts on a corresponding wheel.

Next, the external force estimator 40 calculates a vertical force $F_{z\_ij}$ being exerted on each of the four wheels in step S50. The operation in step S50 corresponds to a function of the wheel load estimator 46.

Specifically, the external force estimator 40 determines the vertical force $F_{z\_ij}$ as the dynamic load $W_{\_ij}$ on each wheel using the longitudinal load shift of each wheel, the lateral load shift on each wheel, and the static load on each wheel in accordance with the following equation [42] (see the equation [18]):

$$F_{z\_ij} = W_{\_ij} = W_{o\_ij} + \Delta W_{x\_ij} + \Delta W_{y\_ij} [N] \quad [42]$$

Next, the external force estimator 40 calculates a lateral force $F_{y\_ij}$ being exerted on each of the four wheels in step S60. The operation in step S60 corresponds to a function of the tire lateral force estimator 45.

Specifically, the external force estimator 40 multiplies the load factor $kW_{\_ij}$ of each wheel and the front lateral force $F_{yf}$ a corresponding front wheel, and multiplies the load factor $kW_{\_ij}$ of each wheel and the rear lateral force $F_{yr}$ a corresponding rear wheel in accordance with the following equations [43] to [46], thus obtaining the lateral forces $F_{y\_ij}$ in step S60:

$$F_{y\_FL} = \frac{W_{FL}}{W_F} F_{yf} \quad [43]$$
$$= \frac{W_o}{W_F} \frac{W_{FL}}{W_o} F_{yf}$$
$$= \frac{W_o}{W_F} kW_{FL} F_{yf}$$
$$= \frac{W_o}{(L_r/L)W_o} kW_{FL} F_{yf}$$
$$= \frac{L}{L_r} kW_{FL} F_{yf}$$

$$F_{y\_FR} = \frac{W_{FR}}{W_F} F_{yf} \quad [44]$$
$$= \frac{W_o}{W_F} \frac{W_{FR}}{W_o} F_{yf}$$
$$= \frac{W_o}{W_F} kW_{FR} F_{yf}$$
$$= \frac{W_o}{(L_r/L)W_o} kW_{FR} F_{yf}$$
$$= \frac{L}{L_r} kW_{FR} F_{yf}$$

$$F_{y\_RL} = \frac{W_{RL}}{W_R} F_{yr} \quad [45]$$
$$= \frac{W_o}{W_R} \frac{W_{RL}}{W_o} F_{yr}$$
$$= \frac{W_o}{W_R} kW_{RL} F_{yr}$$
$$= \frac{W_o}{(L_f/L)W_o} kW_{RL} F_{yr}$$
$$= \frac{L}{L_f} kW_{RL} F_{yr}$$

$$F_{y\_RR} = \frac{W_{RR}}{W_R} F_{yr} \quad [46]$$
$$= \frac{W_o}{W_R} \frac{W_{RR}}{W_o} F_{yr}$$
$$= \frac{W_o}{W_R} kW_{RR} F_{yr}$$
$$= \frac{W_o}{(L_f/L)W_o} kW_{RR} F_{yr}$$
$$= \frac{L}{L_f} kW_{RR} F_{yr}$$

As a result, the various types of forces being exerted on the wheels of the vehicle are calculated by the external force estimator 40.

The road vertical disturbance estimator 47 estimates, based on a vertical disturbance estimation model in the plurality of models M, vertical disturbance force due to the roughness of a corresponding road surface using, for example, information measured by at least one of the sensors 21 to 26 as input parameters.

Next, operations, i.e. functions, of the tire model controller 51 illustrated in FIG. 2 will be described in detail hereinafter.

Figure 7:
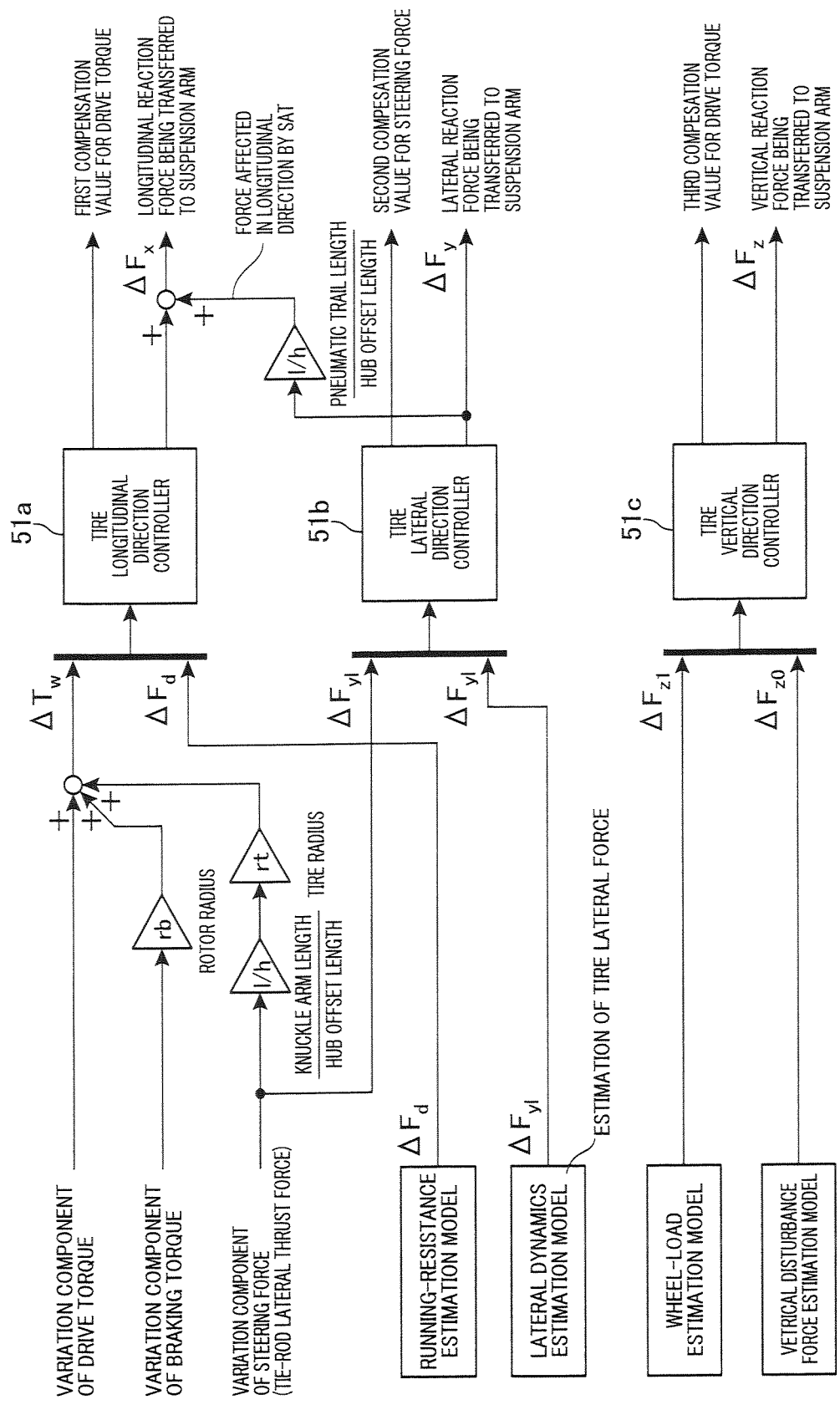
FIG. 7 is a view schematically illustrates operations of a tire model controller illustrated in FIG. 2.

Referring to FIG. 7, the tire model controller 51 includes a tire longitudinal direction controller 51a, a tire lateral direction controller 51b, and a tire vertical direction controller 51c.

The tire longitudinal direction controller 51a is operative to obtain, from information measured by at least one of the sensors 21 to 26 as input parameters, a variation component of the drive torque, a variation component of the braking force, and a variation component $\Delta F_{yl}$ of the steering force, in other words, the tie-rod lateral thrust force to thereby obtain target torque $\alpha T_w$, and obtain, as $\Delta F_d$, the running resistance estimated based on the equation [41] as a model (running-resistance estimation model) in the plurality of models M.

Note that the target torque $\Delta T_w$, includes a torque value corresponding to a translational force around the point of a corresponding tire on the ground as an instantaneous center of rotation; the torque value can be calculated by the product of the translational force and the outer radius of a corresponding tire.

The tire lateral direction controller 51b is operative to obtain the variation component $\Delta F_{yl}$ of the steering force, and obtain, as tire lateral forces $F_{yt}$, the lateral forces estimated based on the equations [43] to [46] as models (lateral-dynamics estimation models) in the plurality of models M.

The tire lateral direction controller 51c is operative to obtain, as wheel load $\Delta F_{zl}$, the vertical force determined based on the equation [42] as a model (wheel-load estimation model) in the plurality of models M, and obtain, as $\Delta F_{zo}$, the vertical disturbance force obtained based on the vertical disturbance estimation model.

Figure 8A:
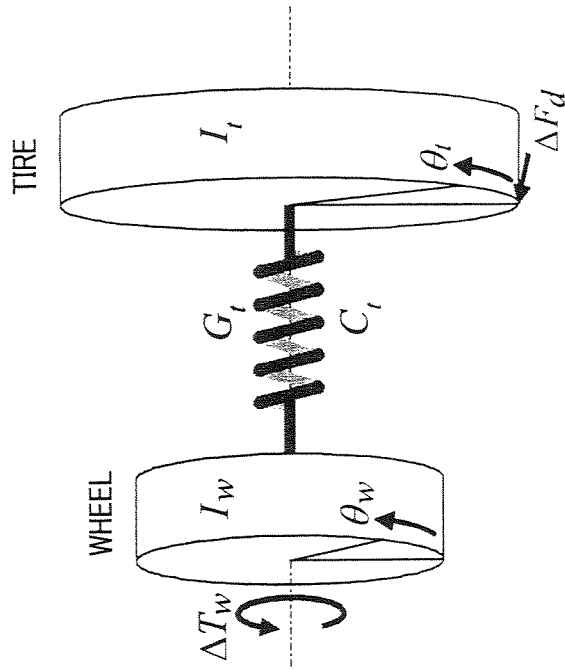
FIGS. 8A and 8B schematically illustrate a longitudinal vibration model according to this embodiment.
Figure 8B:
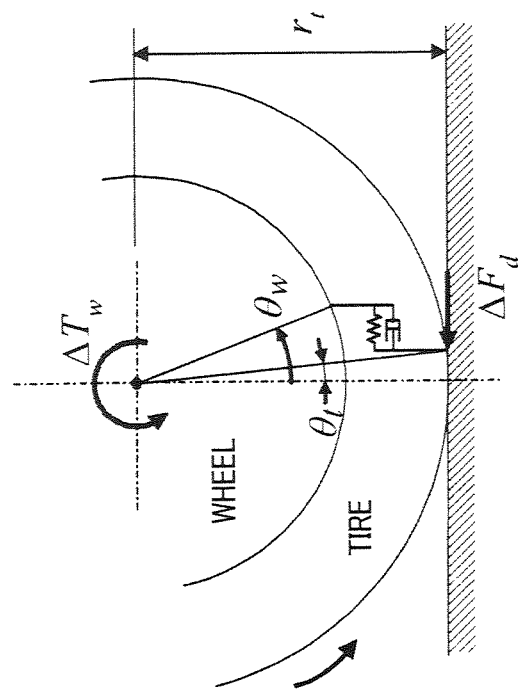

Referring to FIGS. 8A and 8B, the tire longitudinal direction controller 51a is operative to use a longitudinal vibration model in plural tire models in the plurality of models M. For example, as the longitudinal vibration model, a 2-inertia model in which a wheel and a tire are coupled to each other with an imaginary elastic element having a predetermined spring constant and a predetermined damper constant.

The following motion equation [51] is established based on the balance between the target torque $\Delta T_w$ and the running resistance $\Delta F_d$, in the longitudinal vibration model:

$$\begin{cases} I_w \ddot{\theta}_w = -G_t(\theta_w - \theta_t) - C_t(\dot{\theta}_w - \dot{\theta}_t) + \Delta T_w \\ I_t \ddot{\theta}_t = -G_t(\theta_t - \theta_w) - C_t(\dot{\theta}_t - \dot{\theta}_w) + r_t \Delta F_d \end{cases} \quad [51]$$

where $I_w$ represents moment of inertia of a corresponding wheel, $I_t$ represents moment of inertia of a corresponding tire, $\theta_w$ represents a rotating angle of a corresponding wheel with respect to a vertical axis passing the center of the corresponding rim, $G_t$ represents the coefficient of rigidity of a corresponding tire as it is deformed in the rotating direction, $C_t$ represents the coefficient of damping of a corresponding tire as it is deformed in the rotating direction, $\theta_t$ represents a rotating angle of the corresponding tire with respect to the vertical axis, $r_t$ represents the outer radius of the corresponding tire, and the positive sign of the running resistance $\Delta F_d$ corresponds to the travelling direction of the vehicle.

From the equation [51], the following equation [52] is derived:

$$\ddot{\theta}_w - \ddot{\theta}_t = \quad [52]$$
$$-G_t\left(\frac{1}{I_w} + \frac{1}{I_t}\right)(\theta_w - \theta_t) - C_t\left(\frac{1}{I_w} + \frac{1}{I_t}\right)(\dot{\theta}_w - \dot{\theta}_t) + \frac{1}{I_w}\Delta T_w + \frac{r_t}{I_t}\Delta F_d$$

The equation [52] can be converted into the following equation [53]:

$$\begin{bmatrix} \dot{\theta}_{wt} \\ \ddot{\theta}_{wt} \end{bmatrix} \begin{bmatrix} 0 & 1 \\ -G_t\left(\frac{1}{I_w}+\frac{1}{I_t}\right) & -C_t\left(\frac{1}{I_w}+\frac{1}{I_t}\right) \end{bmatrix} \begin{bmatrix} \theta_{wt} \\ \dot{\theta}_{wt} \end{bmatrix} + \begin{bmatrix} 0 & 0 \\ \frac{1}{I_w} & \frac{r_t}{I_t} \end{bmatrix} \begin{bmatrix} \Delta T_w \\ \Delta F_d \end{bmatrix} \quad [53]$$

The equation [53] can be expressed as the following equation [53A]:

$$\begin{bmatrix} \dot{\theta}_{wt} \\ \ddot{\theta}_{wt} \end{bmatrix} = \begin{bmatrix} 0 & 1 \\ a_1 & a_2 \end{bmatrix} \begin{bmatrix} \theta_{wt} \\ \dot{\theta}_{wt} \end{bmatrix} + \begin{bmatrix} 0 & 1 \\ p_1 & p_2 \end{bmatrix} \begin{bmatrix} \Delta T_w \\ \Delta F_d \end{bmatrix} \quad [53A]$$

where $a_1 = -G_t(1/I_w + 1/I_t)$, $a_2 = -C_t(1/I_w + 1/I_t)$, $p_1 = 1/I_w$, $p_2 = r_t/I_t$, $\theta_{wt}$ represents a relative displacement of the corresponding wheel with respect to the ground on which the corresponding wheel is located, $\dot{\theta}_{wt}$ represents a relative velocity of the corresponding wheel with respect to the tire contacting point on the corresponding ground, and $\ddot{\theta}_{wt}$ represents a relative acceleration of the corresponding wheel with respect to the tire contacting point on the corresponding ground.

The tire longitudinal direction controller 51a is operative to obtain, based on a model in the plurality of models M expressed by the equation [53], a first compensation value for compensating at least one of the drive torque, the steering force, and the braking force as a corresponding controlled variable such that the relative velocity of a corresponding wheel with respect to the tread of a corresponding tire, that is, the surface (portion) of a corresponding tire which contacts the corresponding road (ground), becomes zero.

Referring to FIGS. 9A and 9B, the tire lateral direction controller 51b is operative to use a lateral vibration model in the plural tire models in the plurality of models M.

The following motion equation [54] is established based on the balance between a lateral force $\Delta F_{yl}$ exerted on a first micro section of the wheel side of a corresponding tire in contact with a corresponding wheel and a lateral force, i.e. a lateral friction resistance, $\Delta F_{yt}$ exerted on a second micro section of the tread side of the same tire in contact with the road (ground):

$$\begin{cases} m_w \ddot{x}_w = -K_{tl}(x_w - x_t) - C_{tl}(\dot{x}_w - \dot{x}_t) + \Delta F_{yl} \\ m_t \ddot{x}_t = -K_{tl}(x_t - x_w) - C_{tl}(\dot{x}_t - \dot{x}_w) + \Delta F_{yt} \end{cases} \quad [54]$$

where $m_w$ represents the mass of the first micro section of the wheel side of a corresponding tire, $m_t$ represents the mass of the second micro section of the tread side of the same tire, $x_w$ represents a displacement of the first micro section of the same tire with respect to a vertical axis passing the center of the corresponding rim in the y-direction, $x_t$ represents a displacement of the second micro section of the same tire with respect to the vertical axis in the y-direction, $C_{tl}$ represents a damper constant, $K_{tl}$ represents a spring constant, and the positive sign of the lateral friction resistance $\Delta F_{yt}$ corresponds to the inner side of the vehicle body.

From the equation [54], the following equation [55] is derived:

$$\ddot{x}_w - \ddot{x}_t = -K_{tl}\left(\frac{1}{m_w} + \frac{1}{m_t}\right)(x_w - x_t) - \quad [55]$$
$$C_{tl}\left(\frac{1}{m_w} + \frac{1}{m_t}\right)(\dot{x}_w - \dot{x}_t) + \frac{1}{m_w}\Delta F_{yl} + \frac{1}{m_t}\Delta F_{yt}$$

The equation [55] can be converted into the following equation [56]:

$$\begin{bmatrix} \dot{x}_{wt} \\ \ddot{x}_{wt} \end{bmatrix} = \begin{bmatrix} 0 & 1 \\ -K_{tl}\left(\frac{1}{m_w}+\frac{1}{m_t}\right) & -C_{tl}\left(\frac{1}{m_w}+\frac{1}{m_t}\right) \end{bmatrix} \quad [56]$$
$$\begin{bmatrix} x_{wt} \\ \dot{x}_{wt} \end{bmatrix} + \begin{bmatrix} 0 & 0 \\ \frac{1}{m_w} & \frac{1}{m_t} \end{bmatrix} \begin{bmatrix} \Delta F_{yl} \\ \Delta F_{yt} \end{bmatrix}$$

The equation [56] can be expressed as the following equation [56A]:

$$\begin{bmatrix} \dot{x}_{wt} \\ \ddot{x}_{wt} \end{bmatrix} = \begin{bmatrix} 0 & 1 \\ a_1 & a_2 \end{bmatrix} \begin{bmatrix} x_{wt} \\ \dot{x}_{wt} \end{bmatrix} + \begin{bmatrix} 0 & 1 \\ p_1 & p_2 \end{bmatrix} \begin{bmatrix} \Delta F_{yl} \\ \Delta F_{yt} \end{bmatrix} \quad [56A]$$

where $a_1 = -K_{tl}(1/m_w + 1/m_t)$, $a_2 = -C_{tl}(1/m_w + 1/m_t)$, $p_1 = 1/m_w$, $p_2 = 1/m_t$, $x_{wt}$ represents a relative displacement between the first micro section and the second micro section, represents a relative velocity between the first micro section and the second micro section, and $\ddot{x}_{wt}$ represents a relative acceleration between the first micro section and the second micro section.

The tire lateral direction controller 51b is operative to obtain, based on a model in the plurality of models M expressed by the equation [56], a second compensation value for compensating at least the steering force as a corresponding controlled variable such that the relative velocity between the first micro section and the second micro section becomes zero.

Figure 10B:
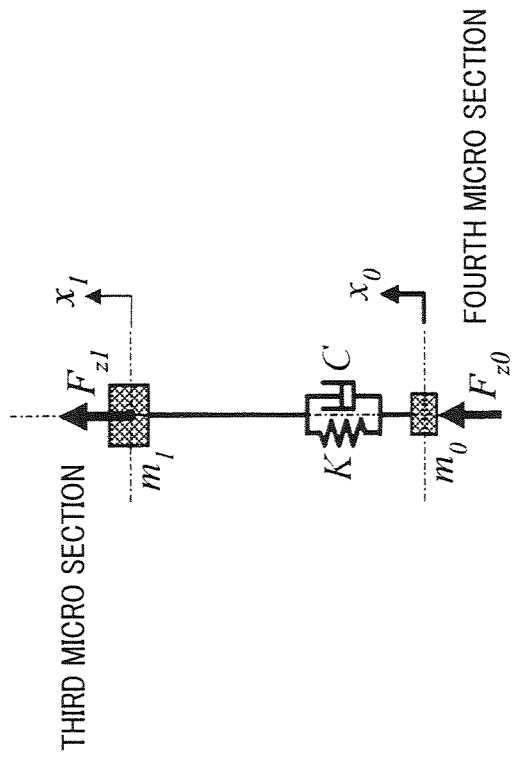
FIGS. 10A and 10B schematically illustrate a vertical vibration model according to this embodiment.
Figure 10A:
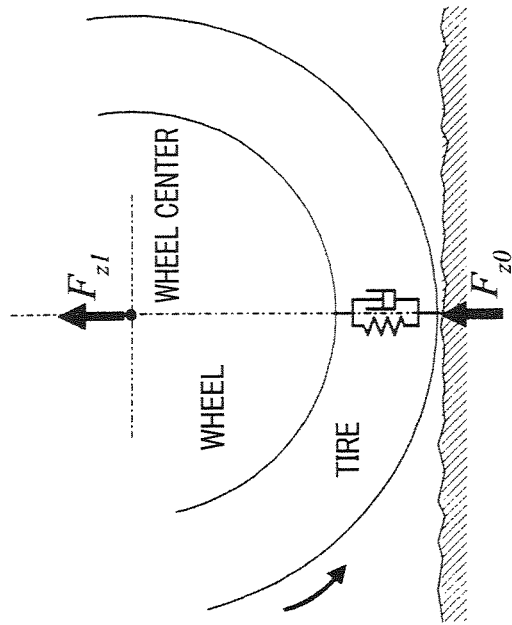

Referring to FIGS. 10A and 10B, the tire vertical direction controller 51c is operative to use a vertical vibration model in the plural tire models in the plurality of models M.

The following motion equation [57] is established based on the balance between a radial force $\Delta F_{yl}$ exerted on a third micro section of the wheel side of a corresponding tire in contact with a corresponding wheel and a radial force, i.e. the vertical disturbance force, $\Delta F_{zo}$ exerted on a fourth micro section of the tread side of the same tire:

$$\begin{cases} m_l \ddot{x}_l = -K(x_l - x_o) - C(\dot{x}_l - \dot{x}_o) + \Delta F_{zl} \\ m_o \ddot{x}_o = -K(x_o - x_l) - C(\dot{x}_o - \dot{x}_l) + \Delta F_{zo} \end{cases} \quad [57]$$

where $m_l$ represents the mass of the third micro section of a corresponding tire, $m_o$ represents the mass of the fourth micro section of the same tire, $x_l$ represents a displacement of the third micro section of the wheel side of the same tire in the z-direction, $x_o$ represents a displacement of the fourth micro section of the tread side of the same tire in the z-direction, C represents a damper constant, and K represents a spring constant.

From the equation [57], the following equation [58] is derived:

$$\ddot{x}_l - \ddot{x}_o = -K\left(\frac{1}{m_l} + \frac{1}{m_o}\right)(x_l - x_o) - C\left(\frac{1}{m_l} + \frac{1}{m_o}\right)(\dot{x}_l - \dot{x}_o) + \frac{1}{m_l}\Delta F_{zl} + \frac{1}{m_o}\Delta F_{zo} \quad [58]$$

The equation [58] can be converted into the following equation [58A]:

$$\begin{bmatrix} \dot{x}_{lo} \\ \ddot{x}_{lo} \end{bmatrix} = \begin{bmatrix} 0 & 1 \\ -K\left(\frac{1}{m_l} + \frac{1}{m_o}\right) & -C\left(\frac{1}{m_l} + \frac{1}{m_o}\right) \end{bmatrix} \begin{bmatrix} x_{lo} \\ \dot{x}_{lo} \end{bmatrix} + \begin{bmatrix} 0 & 0 \\ \frac{1}{m_l} & \frac{1}{m_o} \end{bmatrix} \begin{bmatrix} \Delta F_{zl} \\ \Delta F_{zo} \end{bmatrix} \quad [58A]$$

where $x_{zl}$ represents a relative displacement between the third micro section and the fourth micro section, $\dot{x}_{zl}$ represents a relative velocity between the third micro section and the fourth micro section, and $\ddot{x}_{zl}$ represents a relative acceleration between the third micro section and the fourth micro section.

The tire vertical direction controller 51c is operative to obtain, based on a model in the plurality of models M expressed by the equation [58A], a third compensation value for compensating at least one of the drive torque, the steering force, and the braking force as a corresponding controlled variable such that the relative distance between the third micro section and the fourth micro section becomes zero.

Specifically, as illustrated in FIGS. 2 and 7, the tire model controller 51 outputs, to the adder 13, the first to third compensation values obtained based on the tire models set forth above.

Next, operations, i.e. functions, of the suspension-arm model controller 52 illustrated in FIG. 2 will be described in detail hereinafter.

Figure 11:
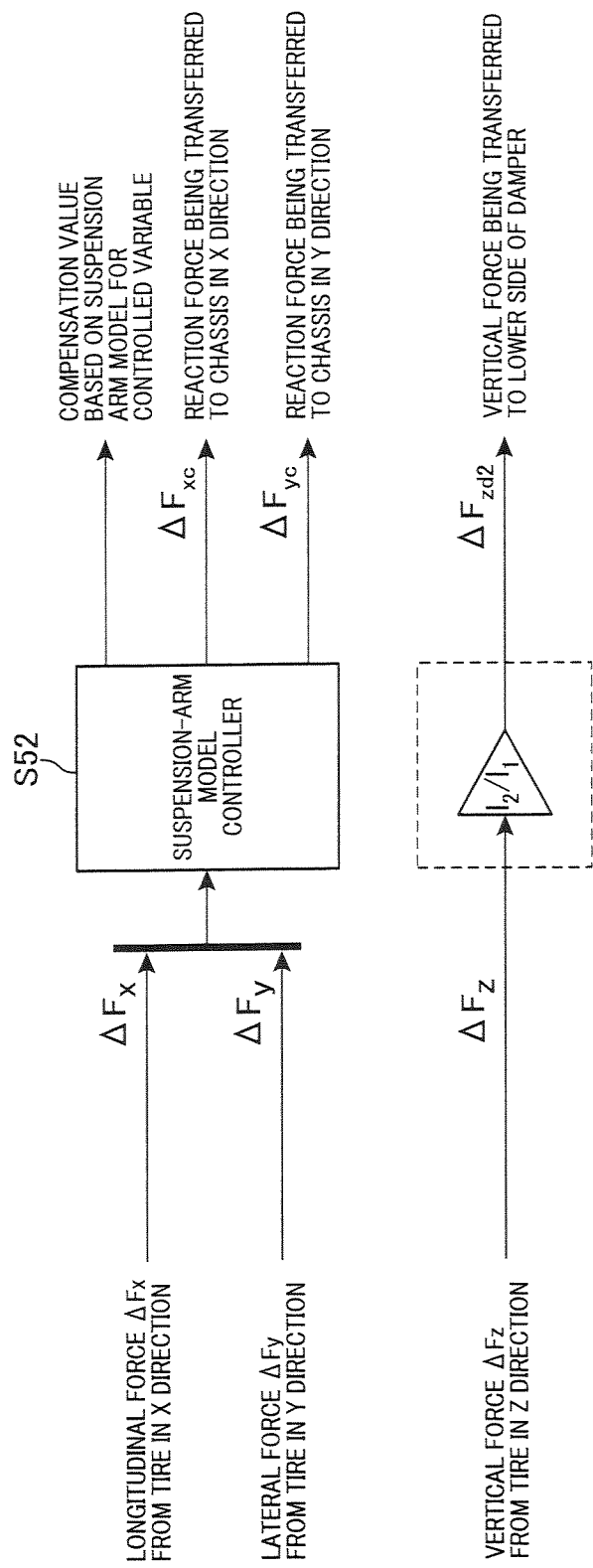
FIG. 11 is a view schematically illustrating inputs and outputs of a suspension-arm model controller illustrated in FIG. 2.

Referring to FIG. 11, the suspension-arm model controller 52 is operative to obtain a longitudinal reaction force $\Delta F_x$ in the x-direction from a corresponding tire based on the torque $\Delta T_w$ and the running resistance $\Delta F_d$ being exerted on the same tire, and a lateral reaction force $\Delta F_y$ in the y-direction from the same tire based on the lateral force $\Delta F_{yl}$ and the lateral force $\Delta F_{yt}$ being exerted on the same tire. Note that a vertical reaction force $\Delta F_z$ is generated in the z-direction from the same tire based on the vertical force $\Delta F_{zl}$ and the vertical force $\Delta F_{zo}$ being exerted on the same tire (see FIGS. 7 and 11).

Figure 12:
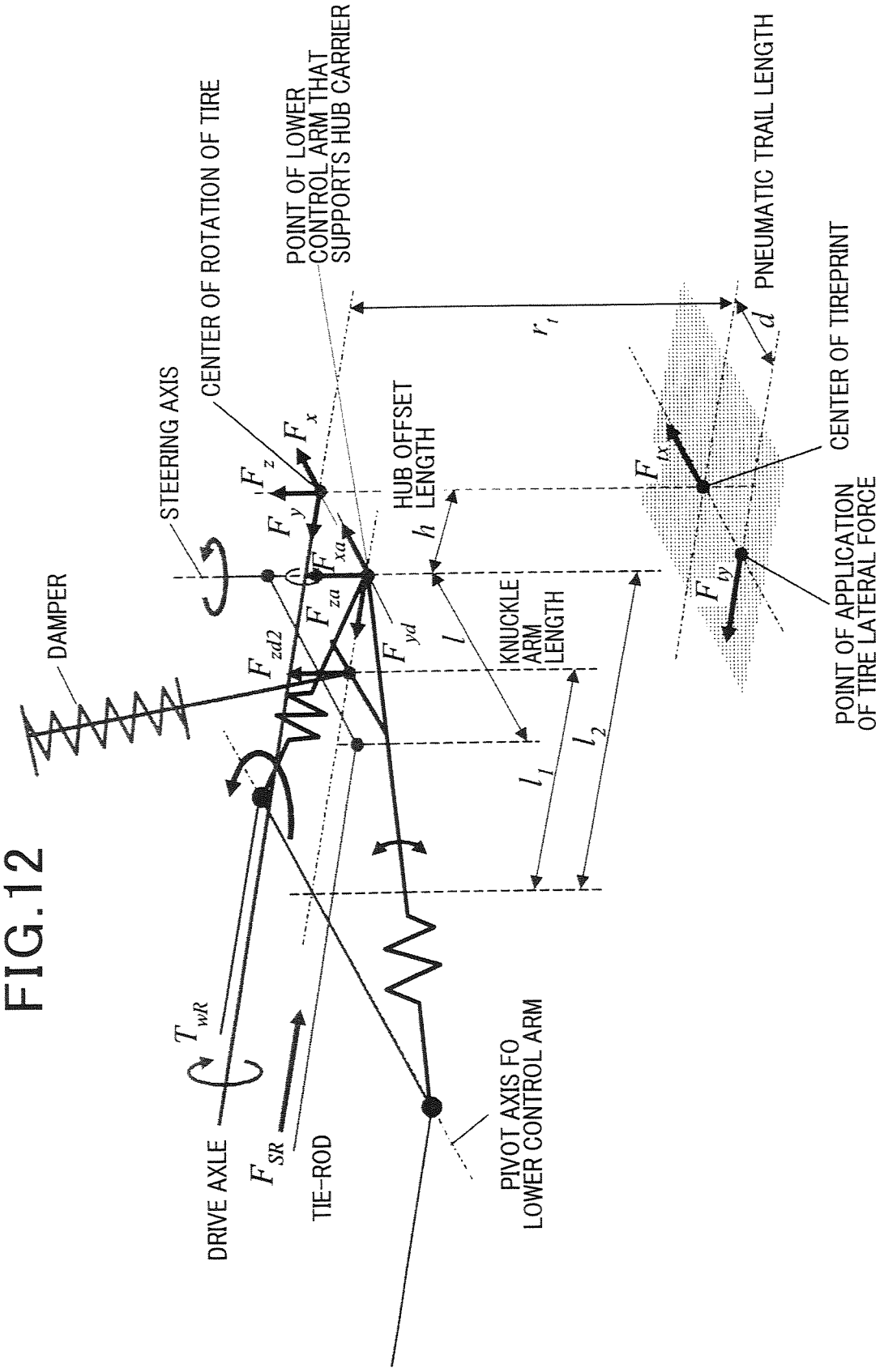
FIG. 12 is a view schematically illustrating a first suspension-arm model according to this embodiment.
Figure 13:
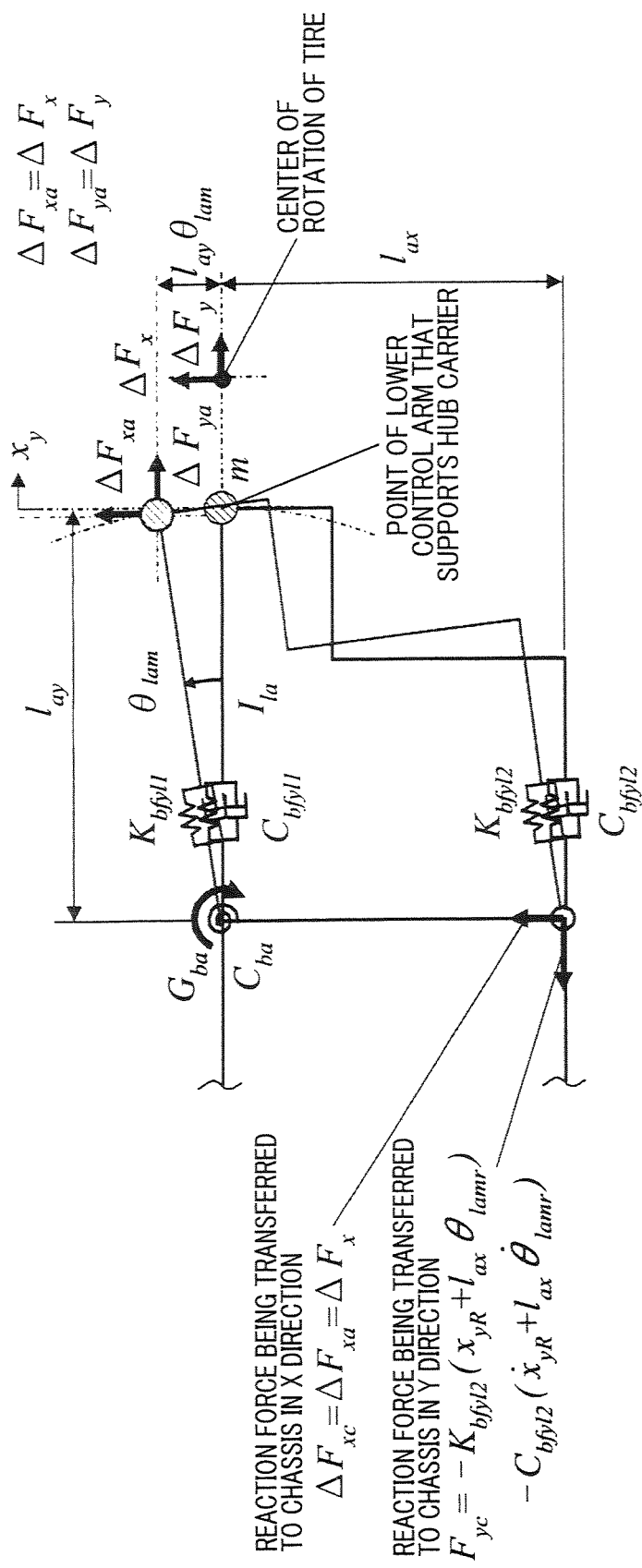
FIG. 13 is a view schematically illustrating the first suspension-arm model slightly modified.

Referring to FIGS. 12 and 13, the suspension-arm model controller 52 is operative to use a first suspension-arm model in the plurality of models M, which simulates longitudinal and lateral behaviors of a suspension arm (lower control arm) of each of the front and rear wheel suspension systems. Referring to FIG. 12, the first suspension-arm model is configured to pivot in the vertical direction (z-axis direction) around the pivot axis of a lower control arm, and to pivot in each of the longitudinal direction (x-axis direction) and the vehicle width direction (y-axis direction) (see FIG. 13). In FIG. 13, the first suspension-arm model is slightly modified for simplification of calculations.

The following motion equations [61] and [62] in the x-y plane are established based on the first suspension-arm model:

$$\begin{cases} m\ddot{x}_y = -(K_{bfy l1}x_y + C_{bfy l1}\dot{x}_y) - \{K_{bfy l2}(x_y + l_{ax}\theta_{lam}) + \\ \quad C_{bfy l2}(\dot{x}_y - l_{ax}\dot{\theta}_{lam})\} + \Delta F_{ya} \\ I_{la}\ddot{\theta}_{lam} = -(G_{ba}\theta_{lam} + C_{ba}\dot{\theta}_{lam}) - l_{ax}\{K_{bfy l2}(x_y + l_{ax}\theta_{lam}) + \\ \quad C_{byf l2}(\dot{x}_y - l_{ax}\dot{\theta}_{lam})\} + l_{ay}\Delta F_{xa} \end{cases} \quad [61]$$

where the parameters in the equation [61] are illustrated in FIG. 13.

Specifically, $\theta_{lam}$ represents the angle of swing of the point of the lower control arm that supports a corresponding hub carrier. The point will be referred to as a hub-carrier supporting point. $I_{la}$ represents moment of inertia of the swing of the hub-carrier supporting point, $C_{bfy1}$ represents a damper constant of the front side of the lower control arm, and $K_{bfy1}$ represents a spring constant of the front side of the lower control arm. $C_{bfy2}$ represents a damper constant of the rear side of the lower control arm, and $K_{bfy2}$ represents a spring constant of the rear side of the lower control arm. $C_{ba}$ represents a longitudinal torsional damping coefficient of a point of the lower control arm swingably supported by the vehicle body, and $G_{ba}$ represents a longitudinal torsional rigidity coefficient of the point of the lower control arm swingably supported by the vehicle body. $\Delta F_{xa}$ represents an external force being exerted on the hub-carrier supporting point in the x-direction, and $\Delta F_{ya}$ represents an external force being exerted on the hub-carrier supporting point in the y-direction.

The equation [61] can be expressed as the following equation [62]:

$$\begin{bmatrix} \dot{x}_1 \\ \dot{x}_2 \\ \dot{x}_3 \\ \dot{x}_4 \end{bmatrix} = \begin{bmatrix} 0 & 1 & 0 & 0 \\ d_1 & d_2 & d_3 & d_4 \\ 0 & 0 & 0 & 1 \\ e_1 & e_2 & e_3 & e_4 \end{bmatrix} \begin{bmatrix} x_1 \\ x_2 \\ x_3 \\ x_4 \end{bmatrix} + \begin{bmatrix} 0 & 0 \\ 0 & q_2 \\ 0 & 0 \\ q_1 & 0 \end{bmatrix} \begin{bmatrix} u_1 \\ u_2 \end{bmatrix} \quad [62]$$

where $d_1 = -(K_{bfyl1}x_y + K_{bfyl2})/m$, $d_2 = -(C_{bfyl1}x_y + C_{bfyl2})/m$, $d_3 = -l_{ax}K_{bfyl2}/m$, $d_4 = -l_{ax}C_{bfyl2}/m$, $e_1 = -l_{ax}K_{bfyl2}/I_{la}$, $e_2 = -l_{ax}C_{bfyl2}/I_{la}$, $e_3 = -(G_{ba} + l_{ax}^2 K_{bfyl2})/I_{la}$, $e_4 = -(C_{ba} + l_{ax}^2 C_{bfyl2})/I_{la}$, $q_1 = l_{la}/I_{la}$, and $q_2 = 1/m$ The suspension-arm controller 52 is operative to obtain, based on a model in the plurality of models M expressed by the equation [62], a compensation value for compensating at least one of the drive torque, the steering force, and the braking force as a corresponding controlled variable such that the moving speed of the point of a lower control arm that supports a corresponding hub carrier becomes zero.

Figure 14:
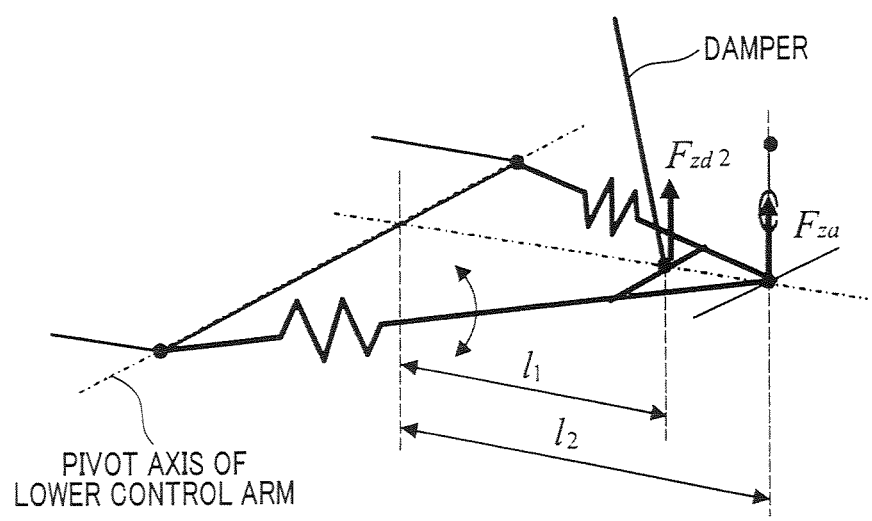
FIG. 14 is a view schematically illustrating a second suspension-arm model according to this embodiment.

In addition, in a second suspension-arm model in the plurality of models M illustrated in FIG. 14, which simulates vertical behaviors of the suspension arm (lower arm) of each of the front and rear wheel suspension systems, vertical force $\Delta F_{zd2}$ being exerted on the point of a damper that supports a corresponding lower control arm is expressed by the following equation [63]:

$$\Delta F_{zd2} = \frac{l_2}{l_1} \Delta F_{za} \quad [63]$$

where $\Delta F_{za}$ represents an external force being exerted on the hub-carrier supporting point in the z-direction, $l_2$ represents the distance between the point of a lower control arm that supports a corresponding hub carrier and the pivot axis of the same lower control arm, and $l_1$ represents the distance between the point of a damper that supports a corresponding lower control arm and the pivot axis of the same lower control arm. The external force $\Delta F_{zd2}$, serving as a vertical force being transferred to the lower side of a corresponding damper, is supplied to the spring-damper model controller 53. Note that, in the equation [63], the balance in force at the point of a damper that supports a corresponding lower control arm is only considered without consideration of their dynamic characteristics.

In addition, the suspension-arm model controller 52 is operative to obtain a longitudinal reaction force $\Delta F_{xc}$ in the x-direction being transferred to the chassis in accordance with the following equation [63]:

$$\Delta F_{xc} = \Delta F_{xa} = \Delta F_x \quad [63A]$$

Similarly, the suspension-arm model controller 52 is operative to obtain a lateral reaction force $\Delta F_{yc}$ in the y-direction being transferred to the chassis in accordance with the following equation [63B]:

$$\Delta F_{yc} = -K_{bfyl2}(x_{yR} + l_{ax}\theta_{lamr}) - C_{byfl2}(\dot{x}_{yR} + l_{ax}\dot{\theta}_{lamr}) \quad [63B]$$

Next, operations, i.e. functions, of the spring-damper model controller 53 illustrated in FIG. 2 will be described in detail hereinafter.

Figure 15:
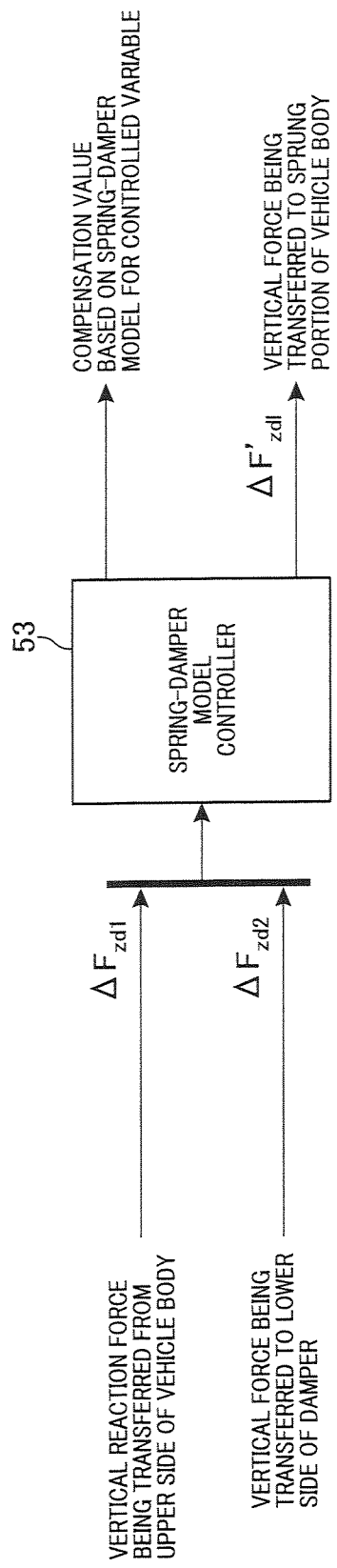
FIG. 15 is a view schematically illustrating inputs and outputs of a spring-damper model controller illustrated in FIG. 2.

Referring to FIG. 15, the spring-damper model controller 53 is operative to obtain a vertical reaction force $\Delta F_{zd1}$, which is transferred from the upper side of the vehicle body higher than the unsprung portion of the vehicle body, based on the drive torque being applied to the vehicle body, and the vertical force $\Delta F_{zd2}$ set forth above.

Figure 16B:
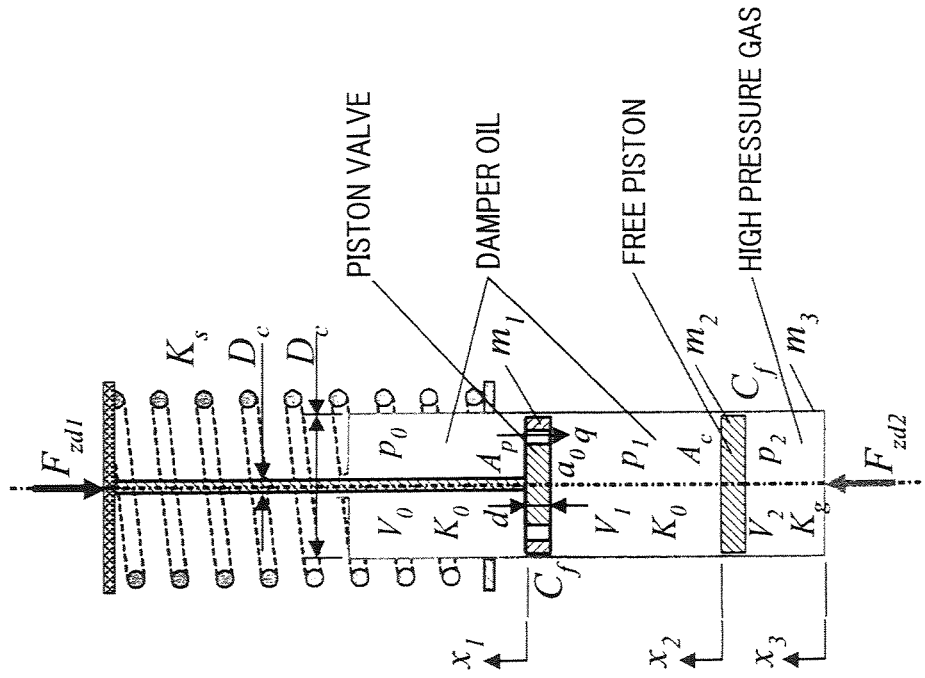
FIGS. 16A and 16B schematically illustrate a spring-damper model according to this embodiment.
Figure 16A:
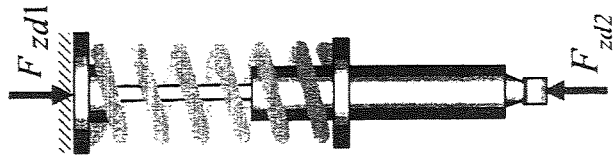

Referring to FIGS. 16A and 16B, the spring-damper model controller 53 is operative to use a vibration model of a hydraulic stroke system, that is, a spring-damper model, in the plurality of models M.

The following motion equations [64] are established based on the vibration model of the hydraulic stroke system:

$$\begin{cases} \dfrac{dp_1}{dt} - \dfrac{dp_0}{dt} = -\dfrac{\pi a_0^4 K_0}{8\mu d}\left(\dfrac{1}{V_0} + \dfrac{1}{V_1}\right)(p_1 - p_0) - \\ \quad K_0\left(\dfrac{A_c}{V_1} + \dfrac{A_c - A_p}{V_0}\right)\left(\dfrac{dx_1}{dt} - \dfrac{dx_3}{dt}\right) + \\ \quad A_c \dfrac{K_0}{V_1}\left(\dfrac{dx_2}{dt} - \dfrac{dx_3}{dt}\right) \\[4pt]
\dfrac{dp_2}{dt} - \dfrac{dp_1}{dt} = -\dfrac{\pi a_0^4}{8\mu d}\dfrac{K_0}{V_1}(p_1 - p_0) + \\ \quad A_c \dfrac{K_0}{V_1}\left(\dfrac{dx_2}{dt} - \dfrac{dx_3}{dt}\right) - A_c \dfrac{K_0}{V_1} + \dfrac{K_g}{V_2}\left(\dfrac{dx_2}{dt} - \dfrac{dx_3}{dt}\right) \\[4pt]
\dfrac{d^2 x_1}{dt^2} - \dfrac{d^2 x_3}{dt^2} = -K_s\left(\dfrac{1}{m_1} + \dfrac{1}{m_3}\right)(x_1 - x_3) - \\ \quad \left(\dfrac{1}{m_1} + \dfrac{1}{m_3}\right)\left(C_{f1} + 8\pi\mu d\dfrac{A_c^2}{a_0^2}\right) \\ \quad \left(\dfrac{dx_1}{dt} - \dfrac{dx_3}{dt}\right) - \dfrac{C_{f2}}{m_3}\left(\dfrac{dx_2}{dt} - \dfrac{dx_3}{dt}\right) - \\ \quad \dfrac{1}{m_1}F_{zd1} - \dfrac{1}{m_3}F_{zd2} \\[4pt]
\dfrac{d^2 x_2}{dt^2} - \dfrac{d^2 x_3}{dt^2} = \dfrac{A_c}{m_2}(p_2 - p_1) - \dfrac{K_s}{m_3} \\ \quad (x_1 - x_3) - \dfrac{1}{m_3}\left(C_{f1} + 8\pi\mu d\dfrac{A_c^2}{a_0^2}\right) \\ \quad \left(\dfrac{dx_1}{dt} - \dfrac{dx_3}{dt}\right) - C_{f2}\left(\dfrac{1}{m_2} + \dfrac{1}{m_3}\right) \\ \quad \left(\dfrac{dx_2}{dt} - \dfrac{dx_3}{dt}\right) - \dfrac{1}{m_3}F_{zd2} \end{cases} \quad [64]$$

where the parameters in the equation [64] are illustrated in FIG. 16.

Specifically, $p_1$ represents hydraulic pressure of lower hydraulic chamber, $p_0$ represents hydraulic pressure of upper hydraulic chamber, $a_0$ represents orifice diameter of piston valve, and $K_0$ represents bulk modulus of upper hydraulic chamber. $V_0$ represents volume of upper hydraulic chamber, $V_1$ represents volume of lower hydraulic chamber, $A_c$ represents cross-sectional area of free piston, and $A_p$ represents cross-sectional area of piston valve. $p_2$ represents gas pressure of high-pressure gas chamber, $K_s$ represents spring constant of coil spring, $K_g$ represents bulk modulus of high-pressurized gas, $V_2$ represents volume of high-pressure gas chamber, $Cf_1$ represents damper coefficient caused by friction between piston valve and cylinder wall, and $Cf_2$ represents damper coefficient caused by friction between free piston and cylinder wall. $\mu$ represents coefficient of friction, $m_1$ represents mass of piston valve, $m_2$ represents mass of free piston, and $m_3$ represents mass of cylinder. $x_1$ represents parameter of displacement of piston valve, $x_2$ represents parameter of displacement of free piston, and $x_3$ represents parameter of displacement of cylinder.

At that time, the following state variables $z_1$ to $z_5$, $u_1$, and $u_2$ are defined as follows:

$$z_1 = p_1 - p_2, z_2 = p_2 - p_1, z_3 = x_1 - x_3, z_4 = \dot{x}_1 - \dot{x}_3, z_5 = \dot{x}_2 - \dot{x}_3,$$
$$u_1 = F_{zd1}, \text{ and } u_2 = F_{zd2} \quad [65]$$

Using the state variables $z_1$ to $z_5$, $u_1$, and $u_2$ allows the following state equation [66] to be derived from the motion equation [64]:

$$\begin{bmatrix} \dot{z}_1 \\ \dot{z}_2 \\ \dot{z}_3 \\ \dot{z}_4 \\ \dot{z}_5 \end{bmatrix} = \begin{bmatrix} a_1 & 0 & 0 & a_4 & a_5 \\ b_1 & 0 & 0 & b_4 & b_5 \\ 0 & 0 & 0 & 1 & 0 \\ 0 & 0 & c_3 & c_4 & c_5 \\ 0 & d_2 & d_3 & d_4 & d_5 \end{bmatrix} \begin{bmatrix} z_1 \\ z_2 \\ z_3 \\ z_4 \\ z_5 \end{bmatrix} + \begin{bmatrix} 0 & 0 \\ 0 & 0 \\ 0 & 0 \\ s_1 & s_2 \\ 0 & s_3 \end{bmatrix} \begin{bmatrix} u_1 \\ u_2 \end{bmatrix} \quad [66]$$

where $$a_1 = -\frac{\pi r_0^4 K_0}{8\mu d}\left(\frac{1}{V_0} + \frac{1}{V_1}\right),$$

$$a_4 = -K_0\left(\frac{A_c}{V_1} + \frac{A_c - A_p}{V_0}\right),$$

$$a_5 = A_c \frac{K_0}{V_1},$$

$$b_1 = \frac{\pi r_0^4}{8\mu d} \frac{K_0}{V_1},$$

$$b_4 = A_c \frac{K_0}{V_1},$$

$$b_5 = A_c\left(\frac{K_0}{V_1} + \frac{K_g}{V_2}\right),$$

$$c_3 = -K_s\left(\frac{1}{m_1} + \frac{1}{m_3}\right),$$

$$c_4 = -\left(\frac{1}{m_1} + \frac{1}{m_3}\right)\left(C_{f1} + 8\pi\mu d \frac{A_c^2}{a_0^2}\right),$$

$$c_5 = -\frac{C_{f2}}{m_3},$$

$$d_2 = \frac{A_c}{m_2},$$

$$d_4 = -\frac{1}{m_3}\left(C_{f1} + 8\pi\mu d \frac{A_c^2}{a_0^2}\right),$$

$$d_5 = -C_{f2}\left(\frac{1}{m_2} + \frac{1}{m_3}\right),$$

$$s_1 = -\frac{1}{m_1},$$

$$s_2 = -\frac{1}{m_3}, \text{ and } s_3 = \frac{1}{m_3}$$

The spring-damper model controller 53 is operative to obtain, based on a model in the plurality of models M expressed by the state equation [66], a compensation value for compensating at least one of the drive torque, the steering force, and the braking force such that the term containing $z_1$ or $z_4$ as its coefficient becomes zero.

In addition, the spring-damper model controller 53 is also operative to obtain a vertical force $\Delta F'_{zdl}$ in the z-direction being transferred to a sprung portion of the vehicle from an upper mount of the vehicle.

Note that the longitudinal reaction force $\Delta F_{xc}$ in the x-direction, the lateral reaction force $\Delta F_{yc}$ in the y-direction, and the vertical force $\Delta F'_{zdl}$ in the z-direction can be used as external input to vibration models for controlling vibrations of target portions of the sprung portion or the chassis of the vehicle to thereby reduce the vibrations.

Returning to FIGS. 1 and 2, the target value calculator 13 is operative to compensate for at least one of the controlled variables (the drive torque, the steering force, and the braking force) determined by the controlled-variable determiner 11 according to the compensation values obtained by the tire longitudinal direction controller 51a, the tire vertical direction controller 51b, the suspension-arm controller 52, and the spring-damper model controller 53, thus generating a corrected value (target value) of at least one of the controlled variables (the drive torque, the steering force, and the braking force). Then, the target value calculator 13 outputs, to a corresponding at least one of the driving system 31, the power steering system 32, and the braking system 33, the target value of the at least one of the controlled variables. This controls the corresponding at least one of the driving system 31, the power steering system 32, and the braking system 33 according to the target value of the at least one of the controlled variables.

As described above, the vehicle control system 1 according to this embodiment is configured to determine a target value for each of the controlled variables for a corresponding controlled object. Referring to FIGS. 17A to 17C, correction of at least one of the controlled variables makes it possible to reduce vibration and/or disturbance, and improve responsivity of the vehicle control system 1.

For example, referring to FIG. 17A, if none of the controlled variables were compensated in control of the target torque $\Delta T_w$, an output $\Delta F_x$ to at least one of the controlled objects 31 to 33 could vibrate. However, compensation for at least one of the controlled variables to correct the target torque $\Delta T_w$ reduces vibration of the output $\Delta F_x$ to at least one of the controlled objects 31 to 33.

Similarly, referring to FIG. 17C, none of the controlled variables were compensated in control of the target torque $\Delta T_w$, an output $\Delta F_x$ to at least one of the controlled objects 31 to 33 could contain disturbance components $\Delta F_d$. However, compensation for at least one of the controlled variables to correct the target torque $\Delta T_w$ reduces disturbance components contained in the output $\Delta F_x$ to at least one of the controlled objects 31 to 33.

In addition, referring to FIG. 17B, if the target torque $\Delta T_w$ overshoots, compensation for at least one of the controlled variables to improve the responsivity $\Delta T_x$ of the control system 1 reduces such an overshoot of the target torque $\Delta T_w$.

Figure 18:
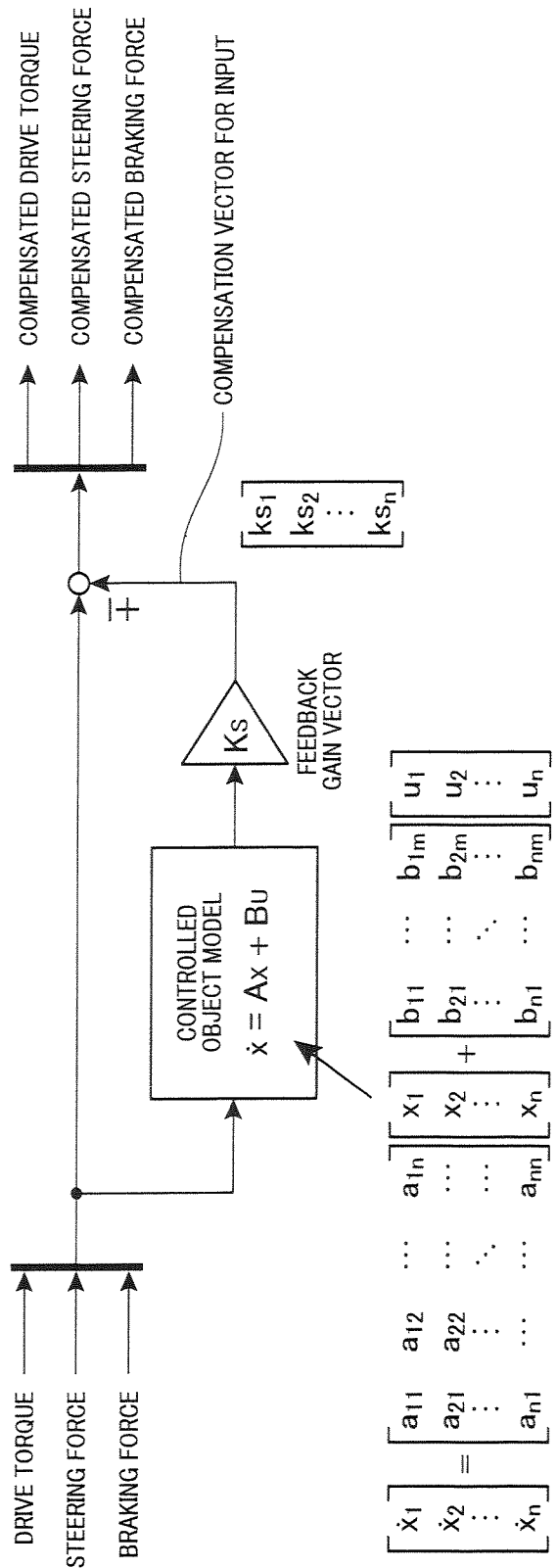
FIG. 18 is a view schematically illustrating a summary of operations of a compensation value calculator and a target value calculator illustrated in FIG. 1.

FIG. 18 schematically illustrates a summary of the operations of the compensation value calculator 12 and the target value calculator 13 set forth above.

Specifically, the compensation-value calculator 12 is designed to use a plurality of multi-input and multi-output control models for corresponding desired controlled objects of the vehicle to estimate the dynamics of the controlled objects, and output a compensation value (a compensation vector) for at least one input to each of the controlled objects using a feedback gain vector; the at least one input is the drive torque, the steering force, or the braking force. The feedback gain vector is designed based on the characteristics of a corresponding one of the controlled objects.

The target value calculator 13 is designed to optimize the compensation values calculated by the compensation value calculator 12, and add the compensation values to values of the corresponding controlled variables determined by the controlled-variable determiner 11 or subtract the compensation values therefrom, thus correcting the values of the controlled variables. Then, the target value calculator 13 is designed to output the corrected values of the controlled variables to the corresponding controlled objects 31 to 33.

For example, if a first compensation value for a controlled variable of a controlled object calculated based on one model stored in the ROM 10b is different from a second compensation value for the same controlled variable calculated based on another model stored in the ROM 10b, the target value calculator 13 is designed to use one of the first and second compensation values such that the behavior of a parameter of the controlled object, such as the displacement or the relative velocity of a parameter of the controlled variable, approaches a target value of, for example, zero. That is, the target value calculator 13 is designed to use one of the first and second compensation values, which increases the stability of the unsprung portion of the vehicle.

If determined compensation values for a common controlled variable are different from each other, the target value calculator 13 can calculate the sum of the different compensation values weighted prior to the calculation. The compensation value calculator 12 can be designed to use a plurality of maps for the respective models stored in the ROM 10b. Each of the maps includes a relationship between a variable of each compensation value and a variable of a corresponding controlled variable. When a value of a controlled variable is input to the compensation-value calculator 12, the compensation value calculator 12 can reference a corresponding map and uniquely determine a compensation value corresponding to the input value of the controlled variable.

In this embodiment, the drive torque estimator 41 corresponds to: a first controlled-force estimator according to an exemplary element of the first exemplary aspect of the present disclosure; and a step of estimating a first controlled force according to an exemplary element of the third exemplary aspect of the present disclosure. The steering force estimator 42 and braking force estimator 43 correspond to: a second controlled-force estimator according to an exemplary element of the first exemplary aspect of the present disclosure; and a step of estimating a second controlled force according to an exemplary element of the third exemplary aspect of the present disclosure. The estimators 44 to 47 correspond to: an external force estimator according to an exemplary element of the first exemplary aspect of the present disclosure; and a step of estimating an external force according to an exemplary element of the third exemplary aspect of the present disclosure. The controllers 51 to 53 correspond to: a dynamics estimator according to an exemplary element of the first exemplary aspect of the present disclosure; and a step of estimating a value of a parameter according to an exemplary element of the third exemplary aspect of the present disclosure. The target value calculator 13 (the controllers 51 to 53) corresponds to: a compensator according to an exemplary element of the first exemplary aspect of the present disclosure; and a compensating step according to an exemplary element of the third exemplary aspect of the present disclosure.

As described above, the vehicle control system 1 according to this embodiment includes the compensation value calculator 12. The compensation value calculator 12 serves as the drive torque estimator 41 to estimate, as a controlled variable, a current value of the drive torque being applied as a force to the corresponding controlled object 31. In addition, the compensation value calculator 12 serves as the steering force estimator 42 to estimate, as a controlled variable, a current value of the steering force being applied as a force to the corresponding controlled object 32. The compensation value calculator 12 also serves as the braking force estimator 43 to estimate, as a controlled variable, a current value of the braking force being applied as a force to the corresponding controlled object 33.

The compensation value calculator 12 further serves as the external force estimator 40 to estimate external forces exerted on the vehicle as the vehicle runs, such as a road-surface reaction force, a friction resistance of a corresponding road surface, wheel loads, vertical reaction forces, and so on. The compensation value calculator 12 serves as the model controllers 51 to 53 to estimate at least one parameter that represents the dynamics of each of the controlled objects 31 to 33. The compensation value calculator 12 serves as the model controllers 51 to 53 to compensate for at least one of the current values of the drive torque, the steering force, and the braking force outputted from the controlled variable calculator 11 such that the value of the parameter is within a preset target range.

The configuration of the vehicle control system 1 estimates the dynamics of at least one controlled object with consideration of not only a force being applied to the at least one controlled object of the vehicle but also a force being exerted on another portion of the vehicle. Thus, it is possible to accurately estimate the dynamics of at least one controlled object.

Adjusting at least one parameter indicative of the dynamics of at least one controlled object within a corresponding target range allows vibration of the vehicle to be reduced, and the stability of the vehicle and the responsivity of the control system 1 to be improved.

Note that at least one parameter that represents the dynamics of each of the controlled objects includes one or more physical values of a portion of a controlled object that represents the dynamics of the corresponding controlled object. For example, a displacement, a velocity, or an acceleration of a portion of a controlled object in one axis of the common coordinate system can be used as at least one parameter for the corresponding controlled object. A rotational displacement or an angular velocity of a portion of a controlled object around one axis of the common coordinate system can also be used as at least one parameter for the corresponding controlled object. A combination of these physical parameters of a portion of a controlled object can be used as at least one parameter for the corresponding controlled object.

The compensation value calculator 12 is configured to estimate forces being applied to the unsprung portion of the vehicle; the unsprung portion represents a portion of the vehicle driven by the driving system 31 and the power steering system 32. This configuration allows the dynamics of the unsprung portion to be adjusted within a target range.

The compensation value calculator 12 is configured to estimate a current value of the drive torque when driving the wheels, and estimates a current value of the steering force and that of the braking force.

This configuration allows, even if at least two of the different forces of the drive torque, the steering force, and the braking force are applied to the vehicle, the applied forces to be optimally controlled.

The compensation value calculator 12 is capable of estimating, as the external forces, reaction forces being applied from a corresponding road surface to the wheels; the reaction forces will be referred to as road-surface reaction forces. The road-surface reaction forces include a running resistance exerted on each wheel in its rotating direction, a lateral force exerted on each wheel, a load including a dynamic load shift on each wheel, and vertical disturbance force exerted on each wheel due to the roughness of a corresponding road surface.

This configuration allows the various road-surface reaction forces to be accurately estimated.

The compensation value calculator 12 estimates the dynamics of each of a plurality of parts of a controlled object of the vehicle while considering predetermined directional forces, which are applied to some portions, are applied to another some other portions, too; the plurality of parts have different dynamic characteristics. For example, the parts include the drive axle, the tie-rod, the front and rear suspension systems, and the wheels. Specifically, the compensation value calculator 12 estimates the dynamics of each of the parts of a controlled object while considering that a longitudinal force based on the drive torque is transferred as a lateral force and a vertical force via tires and/or suspension arms.

Thus, even if a controlled object is made up of a plurality of parts that have different dynamics, the compensation value calculator 12 can estimate the dynamics of the whole of the controlled object, and compensate for the output of the whole of the controlled object. Thus, it is possible to handle the whole system of the controlled object as a multi-input multi-output system.

The compensation value calculator 12 is configured to store therein a control model for each of a plurality of parts constituting a controlled object; the control model for each part is based on one or more motion equations representing the dynamics of the corresponding part. The compensation value calculator 12 is also configured to estimate the dynamics of each part using a corresponding one of the control models.

This configuration using the control model for each part of the controlled object for estimation of the corresponding dynamics increases the accuracy of the estimated dynamics of each part.

The compensation value calculator 12 uses the control models for each wheel having a common coordinate system. Particularly, the common origin coordinate of the common coordinate system of the control models for each wheel is set to an intersection point of the center line of rotation of the corresponding wheel and the plane of rotation of the corresponding wheel passing the center of the tireprint of the corresponding tire on the ground, that is, the center of the tireprint (footprint) of the corresponding tire on the ground. In other words, the common origin coordinate of the common coordinate system of the control models for each wheel is set to an intersection point of the rotation axis of the corresponding wheel and a steering axis of the corresponding wheel around which the corresponding wheel is steered.

This configuration readily implements calculations based on the control models.

The present disclosure is not limited to this embodiment, and can be modified.

The vehicle control system 1 according to this embodiment is configured to make stable the dynamics of the unsprung portion of a vehicle, but can be configured to make stable the dynamics of another portion of a vehicle.

While the illustrative embodiment of the present disclosure have been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A control system installed in a vehicle, the control system comprising:
    a first control unit configured to apply a first controlled force to a first controlled object of the vehicle to control dynamics of the first controlled object;
    a second control unit configured to control a second controlled object of the vehicle, the dynamics of the first controlled object being subject to dynamics of the second controlled object, the control of the second controlled object causing a second controlled force to be applied to the first controlled force;
    a first controlled-force estimator that estimates the first controlled force;
    a second controlled-force estimator that estimates the second controlled force;
    an external force estimator that estimates, as an external force being exerted on the vehicle as the vehicle runs;
    a dynamics estimator that estimates, based on the estimated first controlled force, the estimated second controlled force, and the estimated external force, a value of a parameter that represents the dynamics of the controlled object; and
    a compensator that compensates for at least one of the first controlled force applied by the first control unit or the second controlled force caused by the first controlled force applied by the first control unit such that the value of the parameter is within a preset target range.

2. The control system according to claim 1, wherein the dynamics estimator is configured to estimate, based on the estimated first controlled force, the estimated second controlled force, and the estimated external force, the value of the parameter that represents the dynamics of a non-suspended portion of the vehicle as the first controlled object, the non-suspended portion including a driving system for driving the vehicle and a steering system for steering the vehicle.

3. The control system according to claim 1, wherein the first controlled-force estimator is configured to estimate, as the first controlled force, a first one of a drive torque for driving wheels of the vehicle, a braking force for braking the wheels, or a steering force for steering a steering wheel of the vehicle, and the second controlled-force estimator is configured to estimate a second one of the drive torque, the braking force, or the steering force, the second one being different than the first one.

4. The control system according to claim 1, wherein the external force estimator is configured to estimate, as the external force, one or more reaction forces being applied from a road surface on which the vehicle is located.

5. The control system according to claim 4, wherein the one or more reaction forces include at least one of:
    a running resistance exerted on each wheel of the vehicle in a rotating direction of each wheel;
    a lateral force exerted on each wheel of the vehicle;
    a load on each wheel of the vehicle; or
    a vertical disturbance force exerted on each wheel due to roughness of the road surface.

6. The control system according to claim 1, wherein the first controlled object includes a plurality of controlled parts having different dynamic characteristics, and the dynamics estimator is configured to estimate the dynamics of each of the plurality of controlled parts as the dynamics of the controlled object.

7. The control system according to claim 6, further comprising:
    a storage that stores therein a plurality of control models, each of the plurality of control models being provided for a corresponding one of the plurality of controlled parts, each of the plurality of control models being based on at least one motion equation representing a dynamic characteristic of a corresponding one of the plurality of controlled parts,
    wherein the dynamic estimator is configured to estimate the dynamics of each of the plurality of controlled parts as the dynamics of the controlled object using a corresponding one of the plurality of control models.

8. The control system according to claim 7, wherein the plurality of control models have a common coordinate system with a common origin coordinate.

9. The control system according to claim 8, wherein the plurality of control models are provided for each wheel of the vehicle, and the common origin coordinate of the common coordinate system of the plurality of control models for each wheel is set to an intersection point of a rotation axis of the corresponding wheel and a plane of rotation of the corresponding wheel passing a substantially central portion of a tireprint of a corresponding tire on a corresponding ground.

10. A computer program product comprising:
a non-transitory computer-readable medium; and
a set of computer program instructions embedded in the computer-readable medium, the instructions causing a computer to:
apply a first controlled force to a first controlled object of the vehicle to control dynamics of the first controlled object;
control a second controlled object of the vehicle, the dynamics of the first controlled object being subject to dynamics of the second controlled object, the control of the second controlled object causing a second controlled force to be applied to the first controlled force;
estimate the first controlled force;
estimate the second controlled force;
estimate external force being exerted on the vehicle as the vehicle runs;
estimate, based on the estimated first controlled force, the estimated second controlled force, and the estimated external force, a value of a parameter that represents the dynamics of the first controlled object; and
compensate for at least one of the first controlled force applied by the computer or the second controlled force caused by the first controlled force applied by the computer such that the value of the parameter is within a preset target range.

11. A method of controlling a first controlled object installed in a vehicle the method comprising:
applying a first controlled force to the first controlled object of the vehicle to control dynamics of the first controlled object;
controlling a second controlled object of the vehicle, the dynamics of the first controlled object being subject to dynamics of the second controlled object, the control of the second controlled object causing a second controlled force to be applied to the first controlled force;
estimating the first controlled force;
estimating the second controlled force;
estimating an external force being exerted on the vehicle as the vehicle runs;
estimating, based on the estimated first controlled force, the estimated second controlled force, and the estimated external force, a value of a parameter that represents the dynamics of the first controlled object; and
compensating for at least one of the first controlled force applied by the step of applying or the second controlled force such that the value of the parameter is within a preset target range.

* * * * *